(12) United States Patent
Niitsu et al.

(10) Patent No.: US 6,623,023 B2
(45) Date of Patent: Sep. 23, 2003

(54) BICYCLE AND BICYCLE FOLDING METHOD

(75) Inventors: Takuya Niitsu, Kanagawa (JP); Shinpei Hirano, Tokyo (JP); Atsushi Mamiya, Kanagawa (JP); Shinichi Suzuki, Kanagawa (JP)

(73) Assignee: Sony Corporation (JP)

( * ) Notice: Subject to any disclaimer, the term of this patent is extended or adjusted under 35 U.S.C. 154(b) by 78 days.

(21) Appl. No.: 09/822,180

(22) Filed: Apr. 2, 2001

(65) Prior Publication Data

US 2001/0045723 A1 Nov. 29, 2001

(30) Foreign Application Priority Data

Apr. 3, 2000 (JP) .................................. P2000-105405

(51) Int. Cl.[7] .............................................. B62K 15/00
(52) U.S. Cl. ........................ 280/278; 280/287; 180/220
(58) Field of Search ................................. 280/278, 287; 180/65.1, 205, 208, 218, 219, 220, 223

(56) References Cited

U.S. PATENT DOCUMENTS

| | | | | |
|---|---|---|---|---|
| 3,374,009 A | * | 3/1968 | Jeunet | 280/287 |
| 4,718,688 A | * | 1/1988 | Sanders | 280/278 |
| 4,895,386 A | * | 1/1990 | Hellestam et al. | 280/287 |
| 5,052,706 A | * | 10/1991 | Tsai et al. | 280/287 |
| 5,069,468 A | * | 12/1991 | Tsai et al. | 280/278 |
| 5,149,119 A | * | 9/1992 | Hwang | 280/287 |
| 5,505,277 A | * | 4/1996 | Suganuma et al. | 180/220 |
| 6,152,250 A | * | 11/2000 | Shu-Hsien | 180/220 |
| 6,267,401 B1 | * | 7/2001 | De Jong | 280/287 |

* cited by examiner

*Primary Examiner*—Frank Vanaman
(74) *Attorney, Agent, or Firm*—Rader, Fishman & Grauer PLLC

(57) ABSTRACT

A bicycle and a bicycle folding method which allow a rider to easily and securely fold and unfold the bicycle is described. The bicycle has a front wheel and a rear wheel; a saddle on which a rider rides; a pair of pedals to which the rider imparts drive force; a first frame for holding the front wheel in a rotative manner; a handle for changing the direction of the front wheel; a second frame for holding the rear wheel in a rotative manner; and a linking portion for linking a linking member of the first frame with a linking member of the second frame, wherein the first frame and the second frame are brought close to each other by the rider's lifting the linking portion with the front wheel and the rear wheel kept in contact with the ground, thereby folding up the bicycle with the front wheel and the rear wheel overlapping each other in at least one portion.

5 Claims, 29 Drawing Sheets

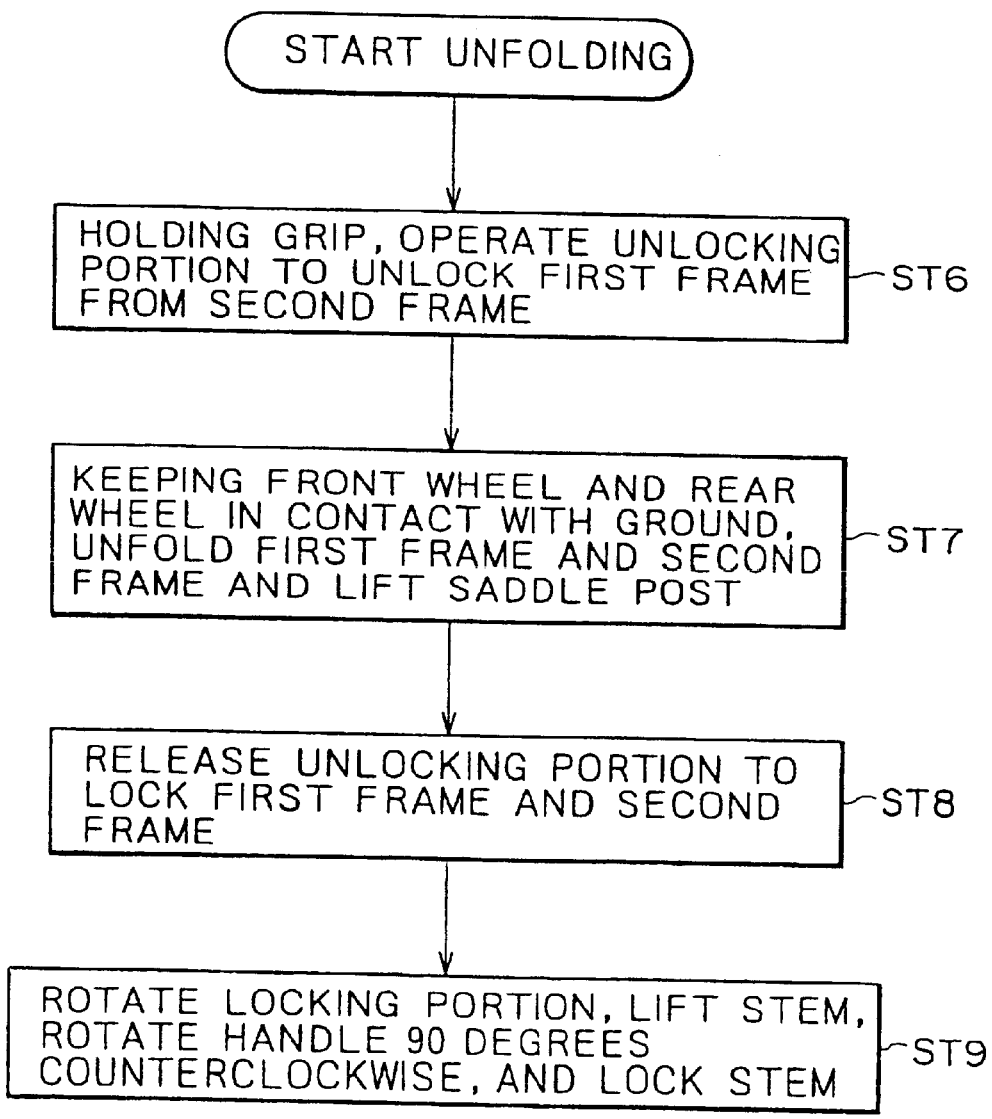

BICYCLE AND BICYCLE FOLDING METHOD

BACKGROUND OF THE INVENTION

The present invention relates substantially to a bicycle and a bicycle folding method to be used by a rider in travel.

When a rider travels on a bicycle, he sits on the saddle and presses the pedals, by which a drive force is transmitted through the drive force transmission section composed of a crank and, for example chains connecting to its rear wheel, thereby driving the bicycle.

Bicycles configured as such include those which are driven only by the pedaling of a rider and others in which the rider pedaling is assisted by an electric motor.

Some of these bicycles can be folded up into shapes that occupy less space when not in use and can be unfolded for use.

These collapsible bicycles, however, have the following problems.

First, in a folded state, most bicycles have an unlocking portion to be operated when folding up and a grip portion to be grasped for pulling up and are arranged separately. This causes a rider difficulty by changing his grips when operating these portions. Another problem is that there is no dedicated grip by which a rider folds up his folded bicycle, thereby decreasing the workability of a holding operation, and sometimes causing the rider's hand to get caught between the bicycle members which are being folded up.

There is no grip by which a rider in travel can carry his folded bicycle. Few bicycles combine the ease and safety of folding operation with the compactness in a folded state.

With respect to the folding of the front wheel or the handle, there has been known a method of folding a pipe portion, or stem portion for supporting the handle, or a method of telescopically sliding the stem portion, thereby shortening the stem portion in the length direction; however, in these methods, there occurs a problem in which the handle is wobbled or the sliding motion of the stem portion is restricted.

In the case of containing the battery pack in the body frame, the battery pack cannot be taken from the body frame from the structural viewpoint of the body frame, unless the bicycle is not folded.

SUMMARY OF THE INVENTION

It is therefore an object of the present invention to provide a bicycle and a bicycle folding method which allow a rider to fold up the bicycle with ease and without fault.

In carrying out the invention and according to one aspect thereof, there is provided a bicycle comprising: a front wheel and a rear wheel; a saddle on which a rider rides; a pair of pedals to which the rider imparts drive force; a first frame for holding the front wheel in a rotative manner; a handle for changing the direction of the front wheel; a second frame for holding the rear wheel in a rotative manner; and a linking portion for linking a linking member of the first frame with a linking member of the second frame, wherein the first frame and the second frame can be brought toward each other by the rider's lifting the linking portion with the front wheel and the rear wheel kept in contact with the ground, thereby folding up the bicycle with the front wheel and the rear wheel overlapping each other in at least one portion thereof.

In carrying out the invention and according to a second aspect thereof, there is provided a bicycle folding method comprising the steps of: lifting by a rider a linking portion of a bicycle linking a linking member of a first frame having a front wheel with a linking member of a second frame having a rear wheel; and folding the first frame and the second frame with the front wheel and the rear wheel kept in contact with the ground in a state where the front wheel and the rear wheel overlap each other in at least one portion thereof.

The above and other objects, features and advantages of the present invention will become apparent from the following description and the appended claims, taken in conjunction with the accompanying drawings in which like parts or elements are denoted by like reference numbers and symbols.

BRIEF DESCRIPTION OF THE DRAWINGS

FIG. 13 is an exploded perspective view illustrating the linking portion, the holder, the first frame, the second frame, a grip or the like;

FIG. 19 is a block diagram illustrating a motor, a controller or the like;

FIG. 29 is a flowchart describing a bicycle unfolding operation.

DETAILED DESCRIPTION OF PREFERRED EMBODIMENTS

Figure 1:
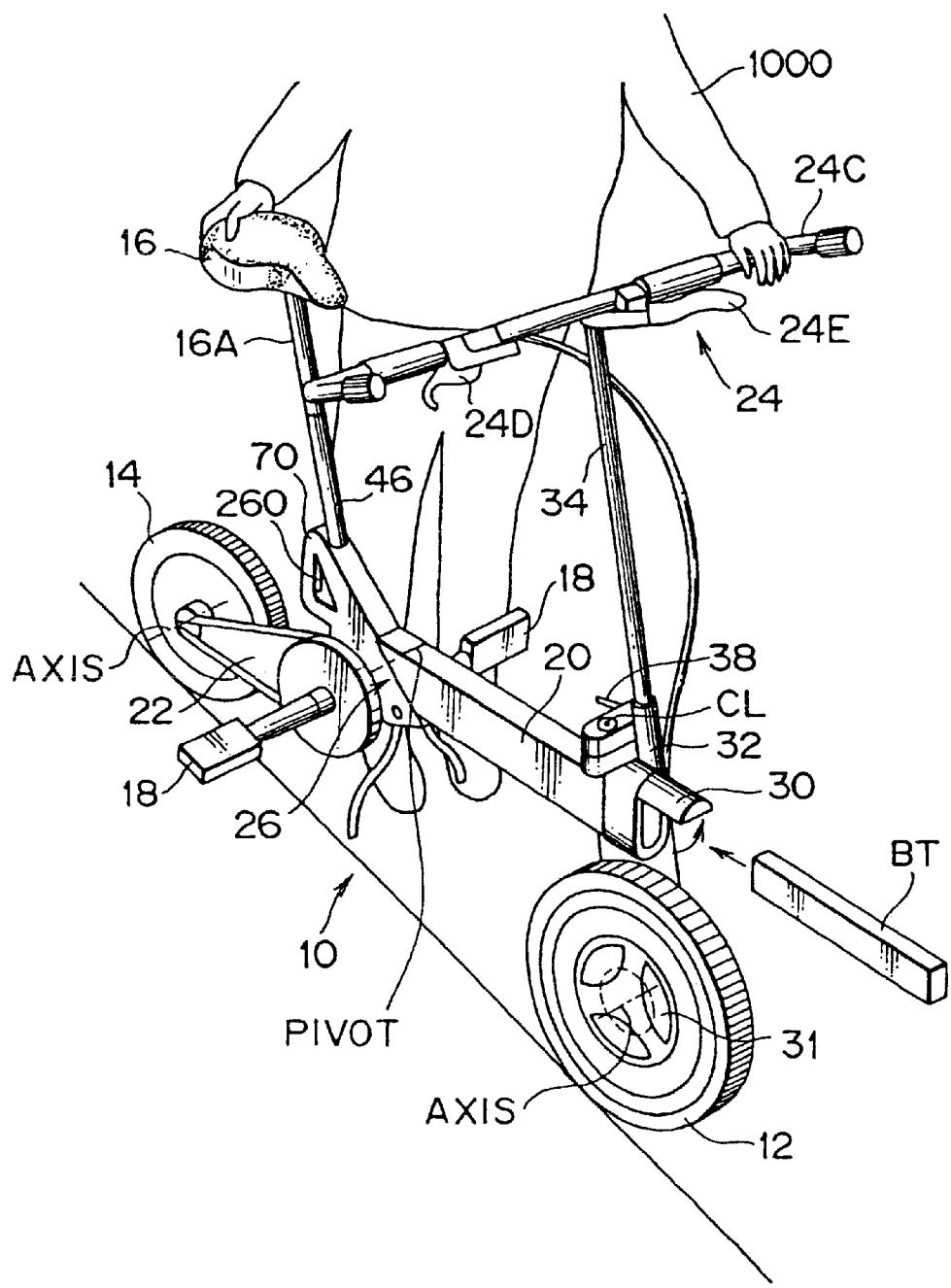
FIG. 1 is a perspective view illustrating a bicycle of the invention.

Now, referring to FIG. 1, there is shown one preferred embodiment of a bicycle according to the present invention.

A bicycle 10 is a motor-assisted bicycle and comprises a front wheel 12, a rear wheel 14, a saddle 16, a pair of pedals 18, a first frame 20, a second frame 22, handle 24, and a linking portion 26.

Figure 2:
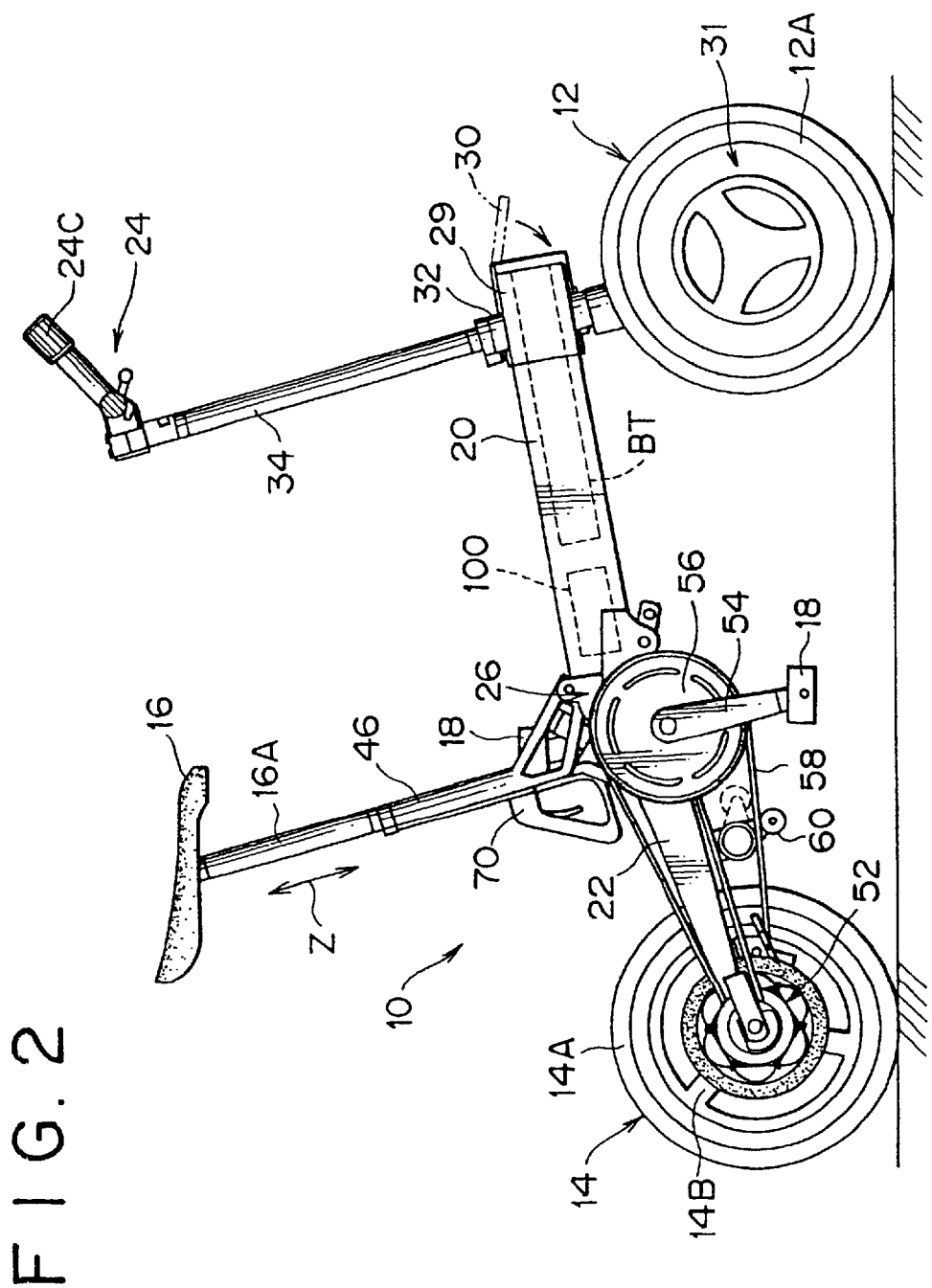
FIG. 2 is a side view of the bicycle shown in FIG. 1.
Figure 3:
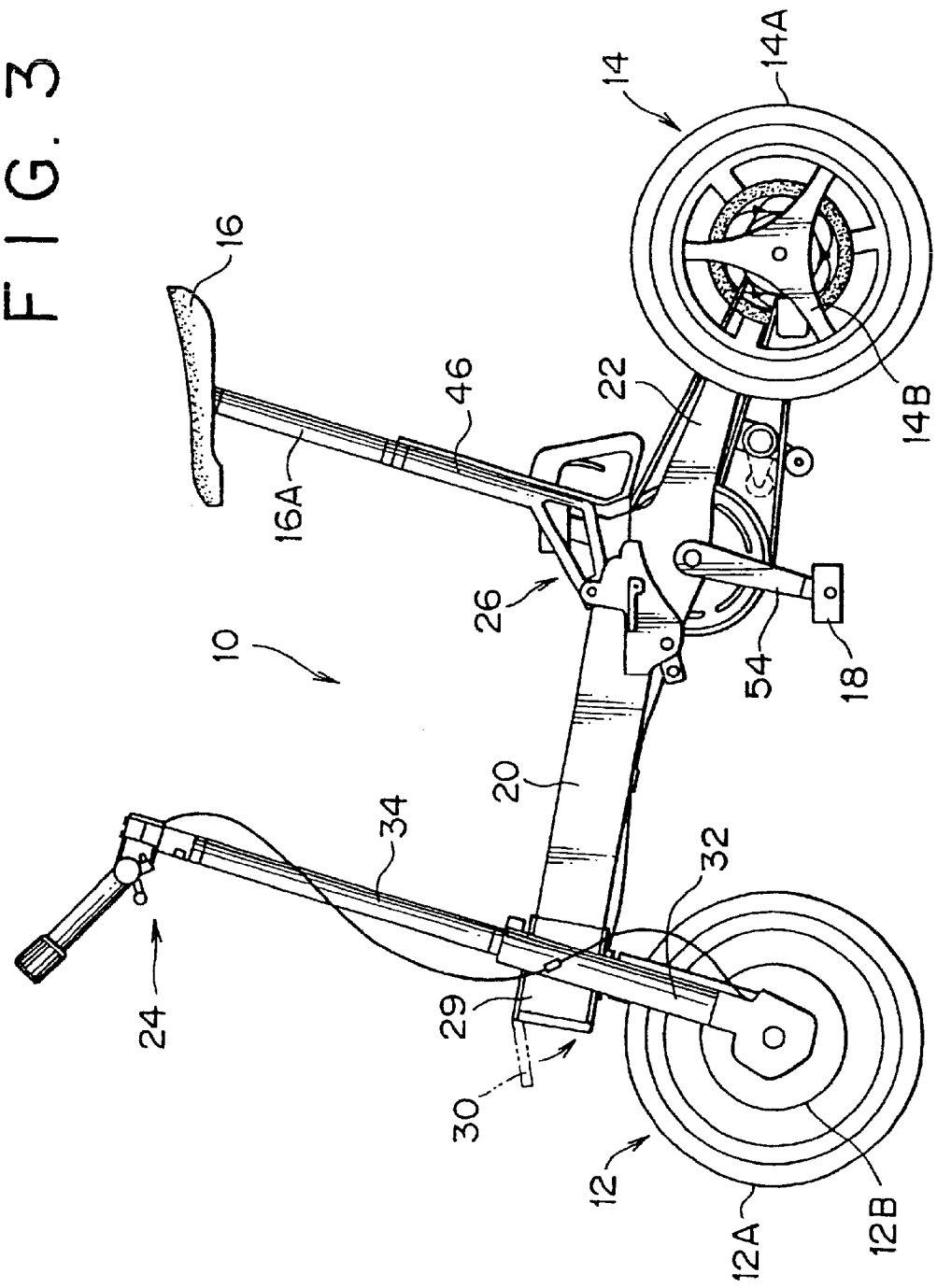
FIG. 3 is another side view of the bicycle shown in FIG. 1.

FIG. 2 shows one side of the bicycle 10 shown in FIG. 1. FIG. 3 shows the other side of the bicycle.

As shown in FIGS. 1 and 2, the front wheel 12 has a motor 31 for assisting the pedaling. A battery BT which is rechargeable for multiple times is detachably accommodated inside the first frame 20. A controller 100 is also accommodated inside the first frame 20. The controller 100 executes various control operations for imparting drive force from the motor 31 to the front wheel 12. The battery BT energizes the motor 31. The controller 100 controls the energization of the motor 31 by the battery BT.

The first frame 20 shown in FIGS. 1 through 3 is a long, hollow box-shaped member made, for example, of a metal. As described, the first frame 20 can detachably accommodate the battery. The battery BT is a lithium-ion battery, a nickel hydrogen battery, a nickel-cadmium battery, a led acid battery, or a fuel cell, for example.

This battery BT may be charged from a household commercial power output, for example. As shown in FIG. 2, a lid 30 is arranged on a front portion 29 of the first frame 20. Opening this lid 30 allows the loading of the battery BT into the first frame 20 or the unloading the battery BT therefrom. The loading or unloading of the battery BT can be done when the bicycle 10 is in an unfolded or use position as shown in FIGS. 1 and 2 or when it is folded, as will be described later. Thus, in any state, the battery BT can be loaded or unloaded because the lid 30 is arranged at the front portion 29, which is an open end, of the first frame 20. Because the battery BT can be accommodated inside the first frame 20, the accommodated battery is not exposed outside, which conceals the use of battery, thereby providing a good external design and pleasing aesthetics.

Figure 4:
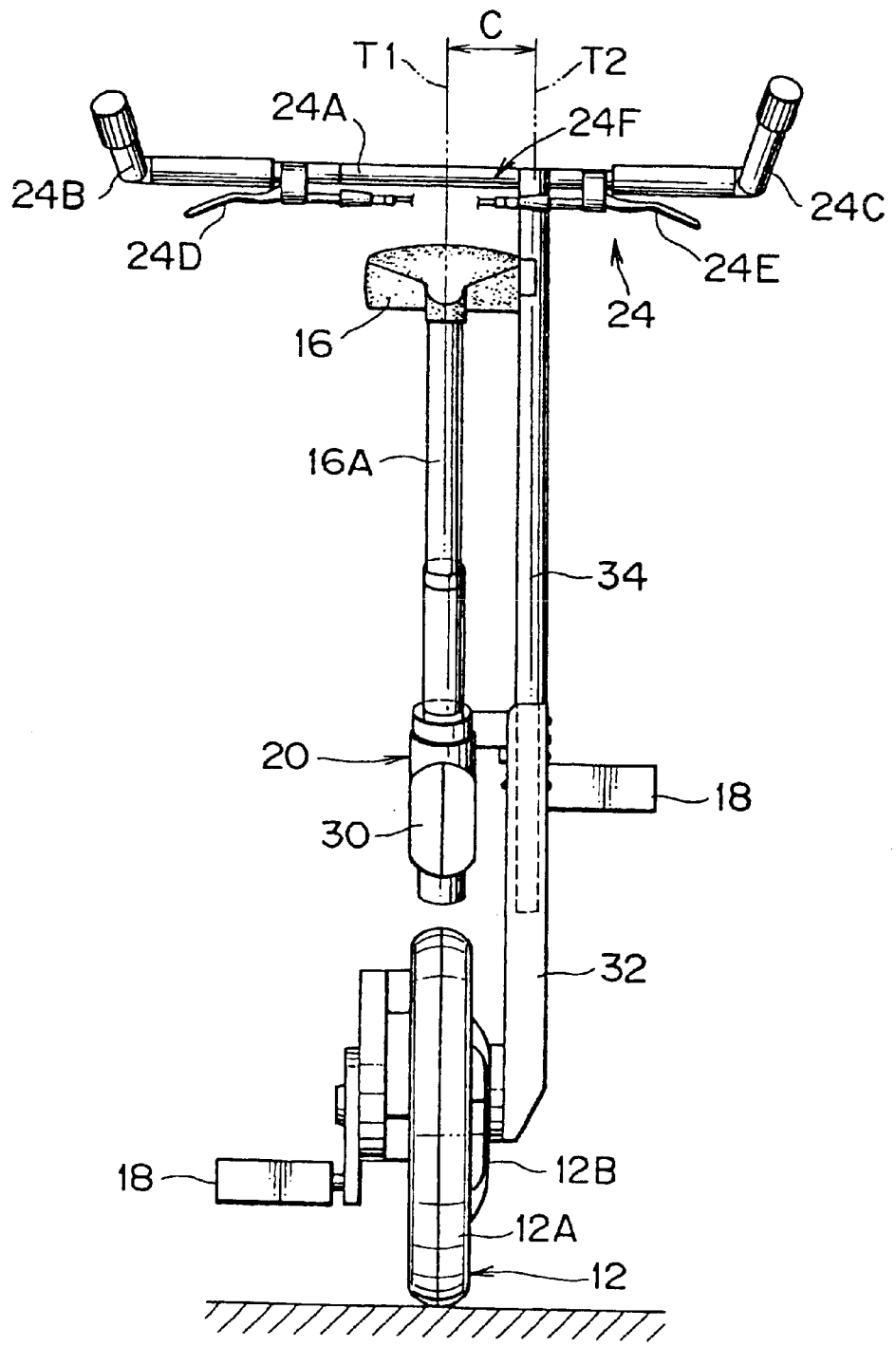
FIG. 4 is a front view of the bicycle shown in FIG. 1.

The front wheel 12 has a tire 12A and a wheel 12B as shown in FIGS. 3 and 4. The wheel 12B is linked with the lower end of a stem holder 32 as shown in FIGS. 3 and 4. The upper end of the stem holder 32 is connected to the first frame 20. The stem holder 32 holds a stem (also referred to as a post) 34 of the handle 24. In the states shown in FIGS. 3 and 4, the lower portion of the stem 34 penetrates in the stem holder 32.

The handle 24 shown in FIG. 4 is attached to the upper end of the stem 34. The handle 24 comprises a horizontal bar 24A, the other handlebar 24B, a stand portion 24C, and brake levers 24D and 24E.

The stand portion 24C is larger than the other handlebar 24B. The brake lever 24D is used to manually brake the front wheel 12 and the brake lever 24E is used to manually brake the rear wheel 14. However, the bicycle may be so configured that the brake lever 24D may brake the rear wheel 14 and the brake lever 24E may brake the front wheel 12.

At the one end and the other end of the horizontal bar 24A shown in FIG. 4, the handlebar 24B and the stand portion 24C are arranged to project toward substantially obliquely front direction. The upper end of the stem 34 is attached to a portion 24F of the horizontal bar 24A. This portion 24F is not in the center of the horizontal bar 24A but is offset from the center axis of the post 16A of the saddle 16 and the first frame 20. Namely, as shown in FIG. 4, when viewed from the front, center axis T2 of the stem 34 is characterized in that it is offset by interval C relative to center axis T1 of the post 16, the first frame 20, and the front wheel 12.

Configured as such, the first frame 20 and the post 16A are located as if directly above the front wheel 12 and the rear wheel 14, but the stem holder 32 and the stem 34 are offset from the post 16A and the first frame 20 or the like.

Figure 6:
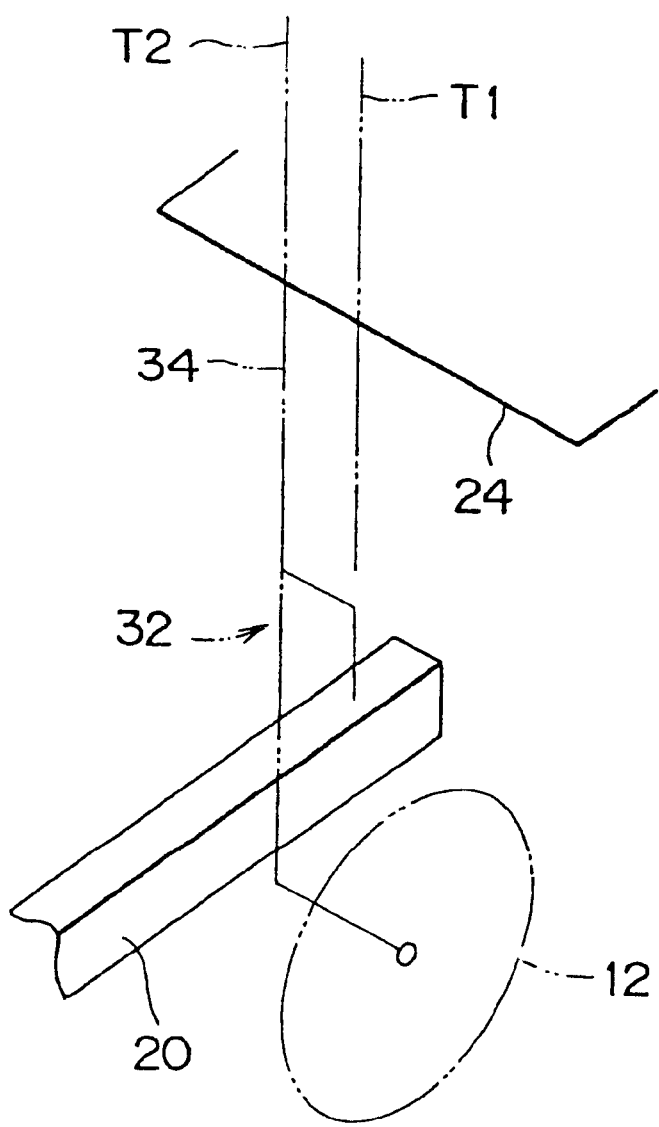
FIG. 6 is a diagram illustrating a simple mechanical configuration illustrating handle, stem, stem holder, a first frame and the front wheel of the bicycle shown in FIG. 1.

FIG. 6 schematically shows a relationship between the center axis T1 and center axis T2.

The post 16A and the stem 34 may be made of metal pipes, for example. The stem holder 32 may be made of a metal, for example.

Figure 5:
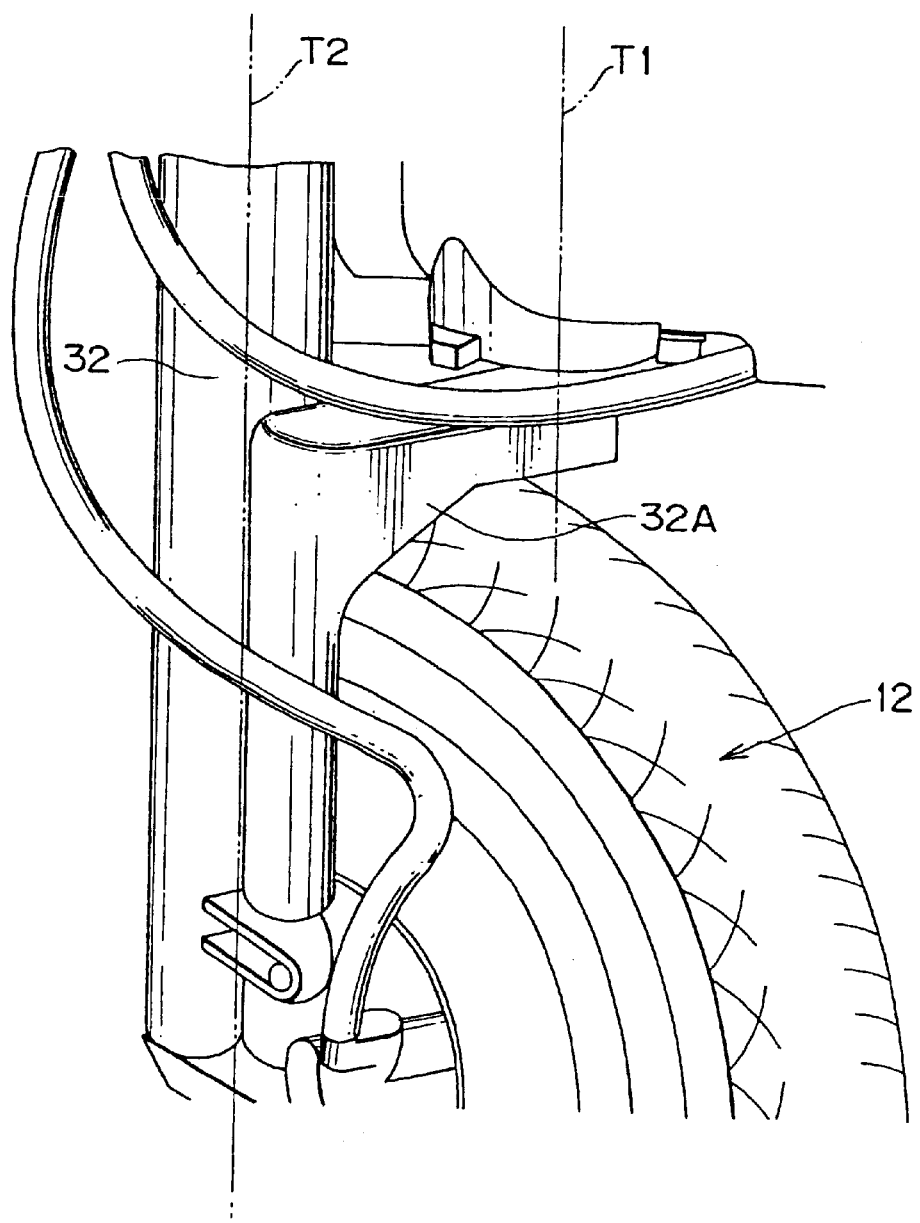
FIG. 5 is a perspective view of the bicycle shown in FIG. 1 and illustrating the bicycle's stem holder and front wheel obliquely from behind.
Figure 7:
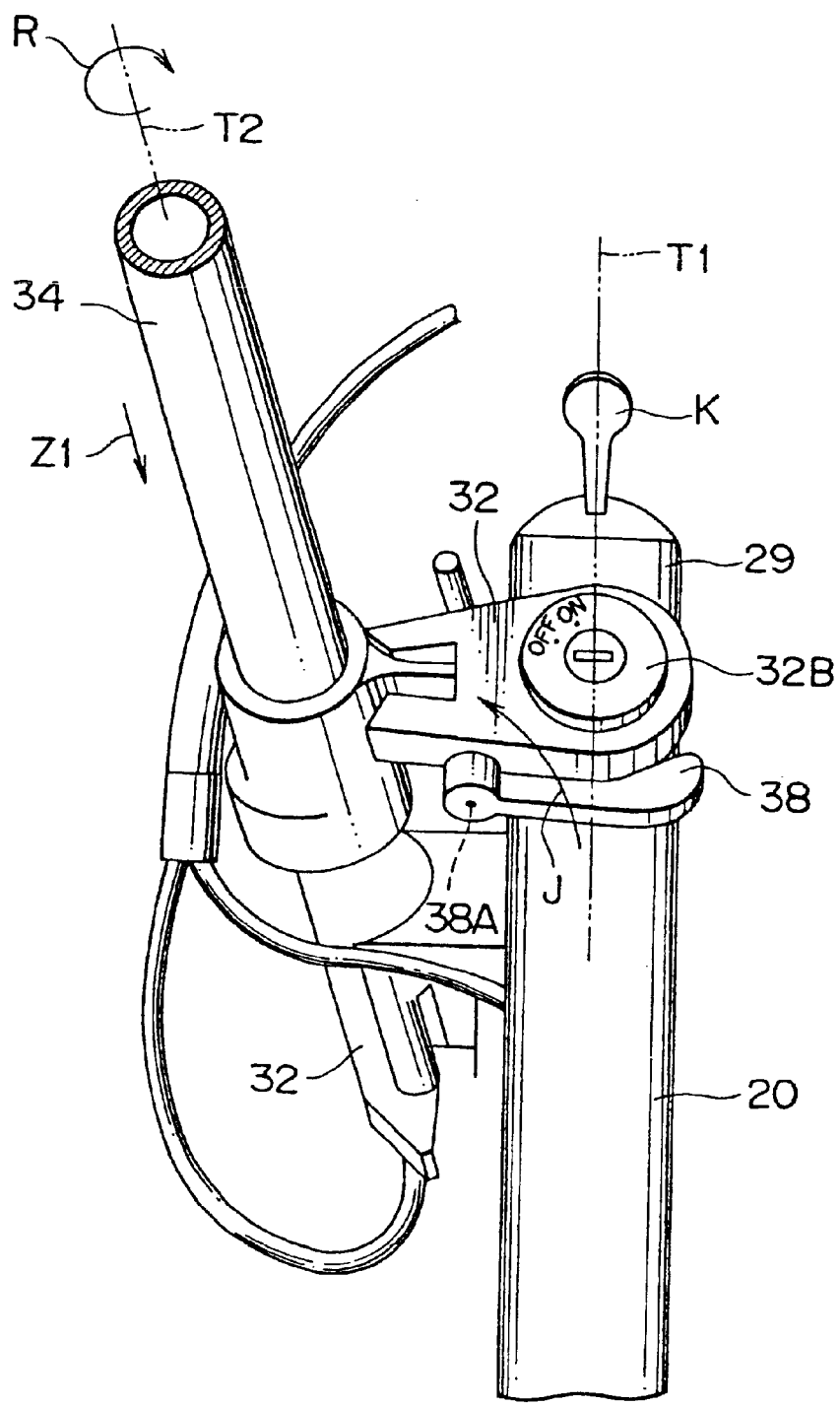
FIG. 7 is a perspective view illustrating the stem, the stem holder, and the first frame obliquely from behind.

FIG. 5 shows the exemplary configurations of the stem holder 32 and the front wheel 12 as viewed obliquely from behind. FIG. 7 shows the stem holder 32, the stem 34, and the first frame 20 as viewed obliquely from upper behind. A mount 32A of the stem holder 32 is attached to the upper side of the front portion 29 of the first frame 20. Arranged on the mount 32A is a key operating portion 32B in which a key K is inserted by the rider before riding. The key K is inserted in the key operating portion 32B and rotated in a predetermined direction, upon which the controller 100, shown in FIG. 1, supplies the power from the battery BT to the motor 31 to bring the bicycle 10 into the motor-assisted mode.

The mount 32A has a lock 38. The lock 38, when rotated in the direction J around axle 38A, releases the lock of the stem 34 to the stem holder 32. When the stem 34 is unlocked, the stem 34 can be lowered in the direction Z1 relative to the stem holder 32 and rotated in the direction R (clockwise in FIG. 7).

Figure 8:
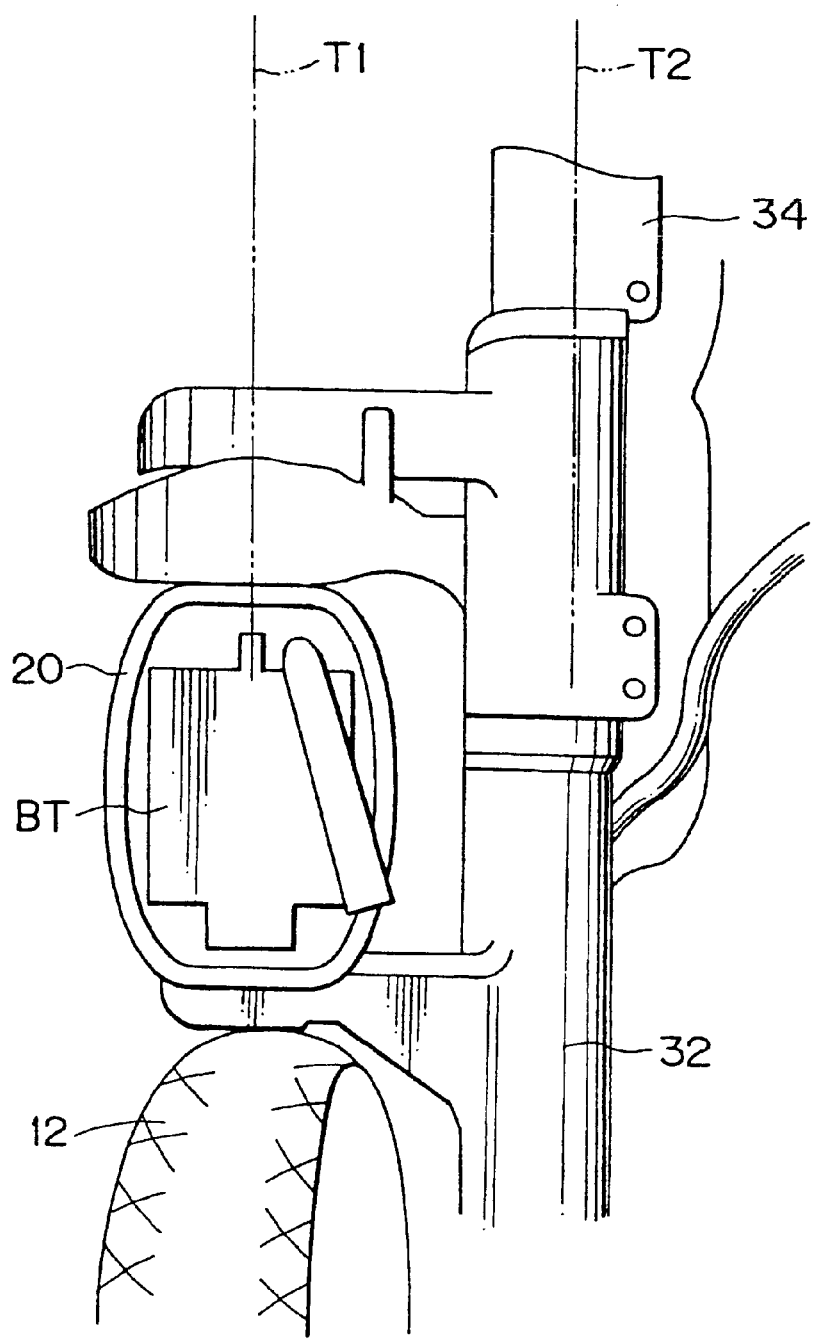
FIG. 8 is a front view illustrating the first frame, the stem holder, and front wheel.

FIG. 8 shows the stem holder 32, the stem 34, and the first frame 20 as viewed from front. As shown in FIG. 8, the battery BT is accommodated inside the first frame 20.

Figure 9:
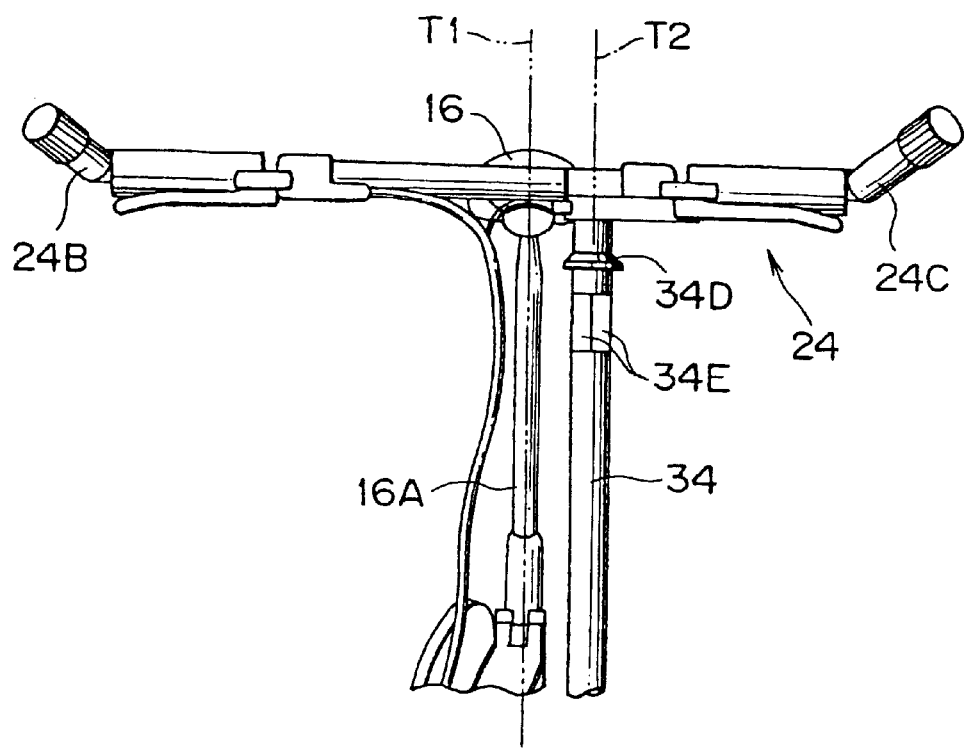
FIG. 9 is a front view illustrating the handle and the stem.

FIG. 9 shows the stem 34 and the handle 24 as viewed from front. A ring stopper 34D is arranged on an upper portion of the stem 34. Notches 34E are formed in the lower side of the stopper 34D.

Figure 10:
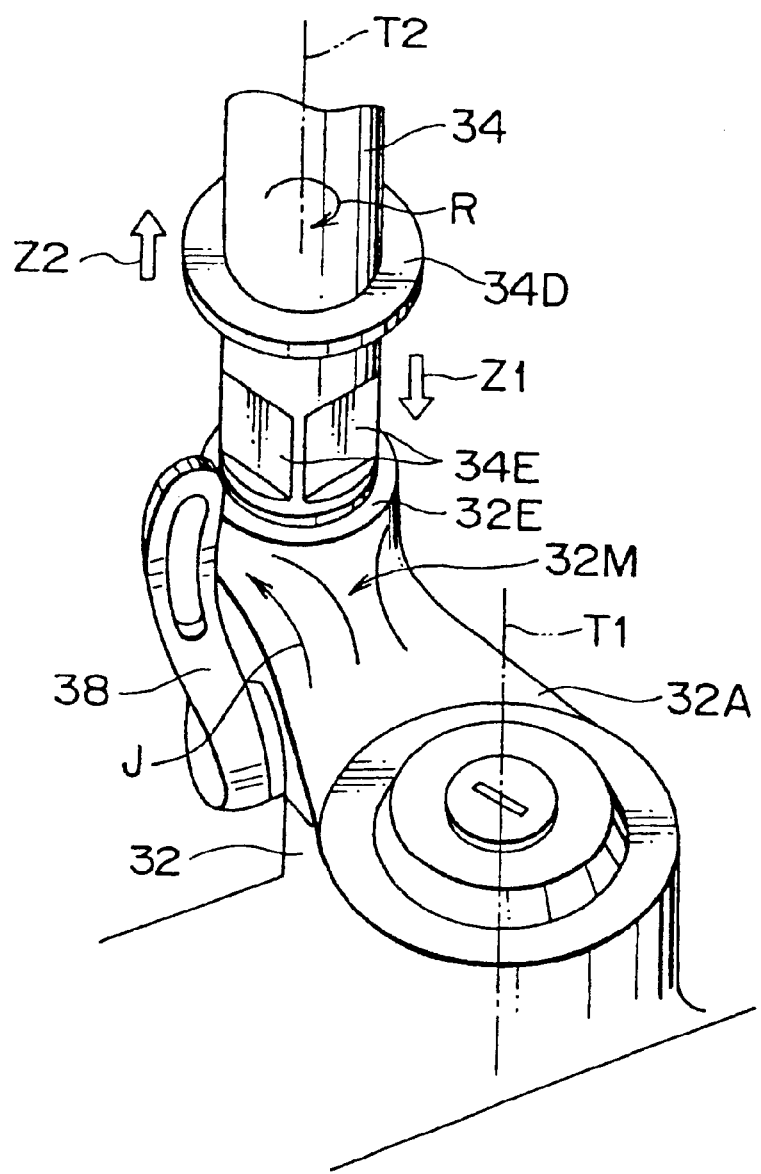
FIG. 10 is a perspective view illustrating the stem, the stem holder and mount, and the first frame from behind.
Figure 11:
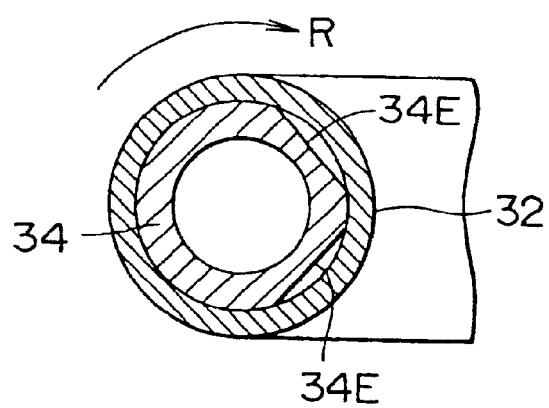
FIG. 11 is a horizontal cross section of the stem and the stem holder.

FIG. 10 shows the stopper 34D, the notches 34E, the mount 32A of the stem holder 32, and the lock 38 as viewed obliquely from behind. When the rider rotates the lock 38 in the direction J and the stem 34 is unlocked, the stem 34 can be lowered in the direction Z1 and rotated in the direction R. When the stem 34 is lowered and rotated, the notches 34E come to a position corresponding to marker a 32M of the mount 32A. When the stem 34 is further lowered in this state, the stopper 34D abuts upper end 32E of the mount 32A, thereby preventing the stem 34 from lowering any further. Then, as shown in FIG. 11, when the lock 38 is operated to lock in the direction opposite to the direction J shown in FIG. 10 in the stem holder 32, the stem 34 is locked by the lock 38 so that the locked stem 34 does not move up to the direction Z2 and rotate.

Thus, the up and down movements and the rotation of the stem 34 are allowed or prevented by the lock 38.

Figure 12:
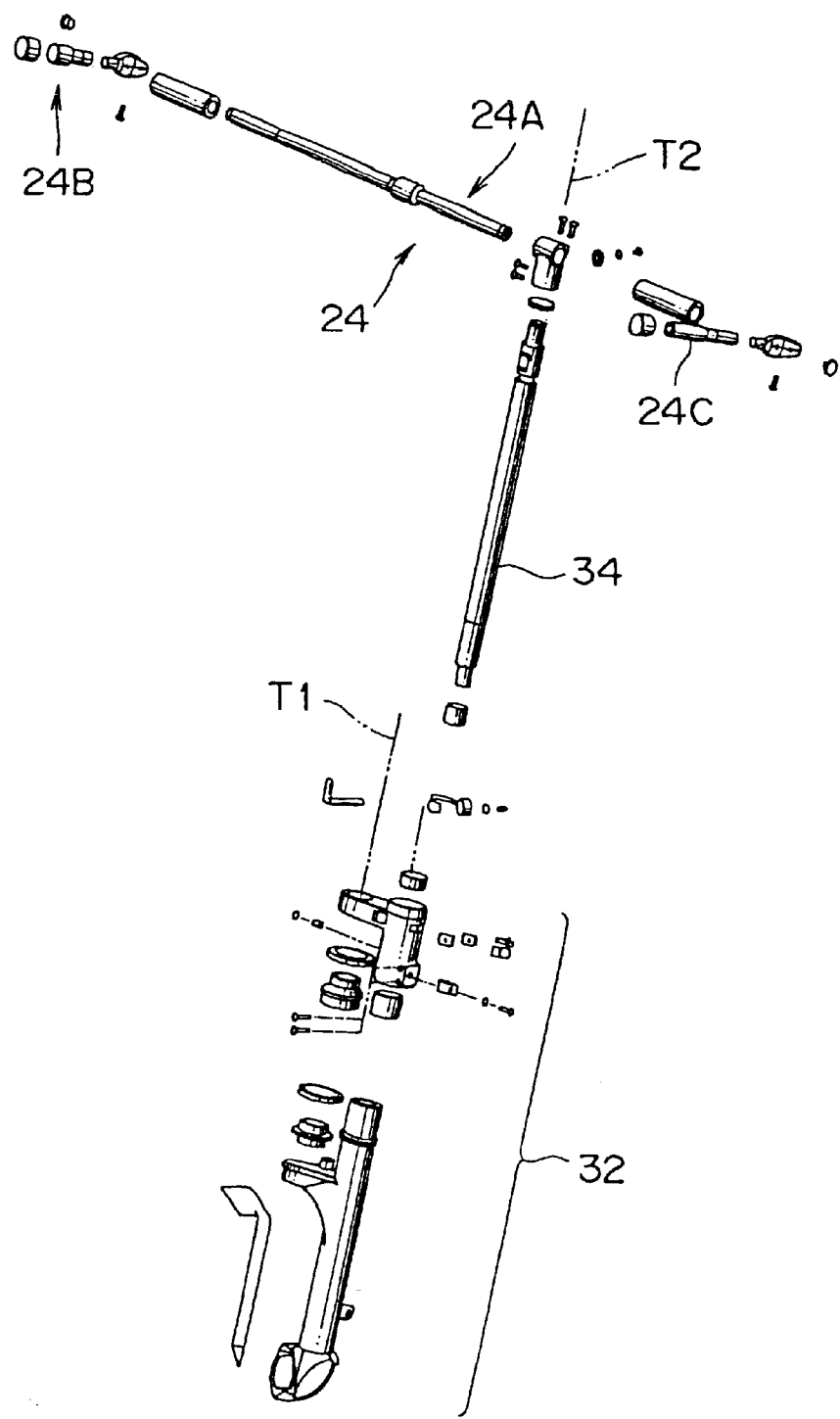
FIG. 12 is an exploded perspective view illustrating the handle, the stem, and the stem holder.

FIG. 12 is an exploded perspective view illustrating an exemplary configuration of the handle 24, the stem 34, and the stem holder 32.

Now, referring to FIGS. 1 and 2 again, the saddle 16 is mounted on top of the post 16A. The post 16a is adapted to move up and down in the direction Z in a holder 46 and to be fixed at a desired position. This allows for adjustment of the height of the saddle 16. The holder 46 and the second frame 22 may be made of a metal, for example.

As shown in FIG. 2, the rear end of the second frame 22 is rotatably held with the rear wheel 14. The rear wheel 14 has a tire 14A and a wheel 14B. The rear wheel 14 and the front wheel 12 may be the same in size, for example.

The wheel 14B of the rear wheel 14 has a gear block 52. The gear block 52 may be constituted by a single gear or a plurality of gears having different number of teeth for gear shifting. A belt 58 is provided between the gear in the gear block 52 and a gear 56 on the side of a crank 54. The belt 58 may be a toothed belt, for example. A tensioner 60 is arranged on the second frame 22 to appropriately adjust the tension of the belt 58.

Figure 13:
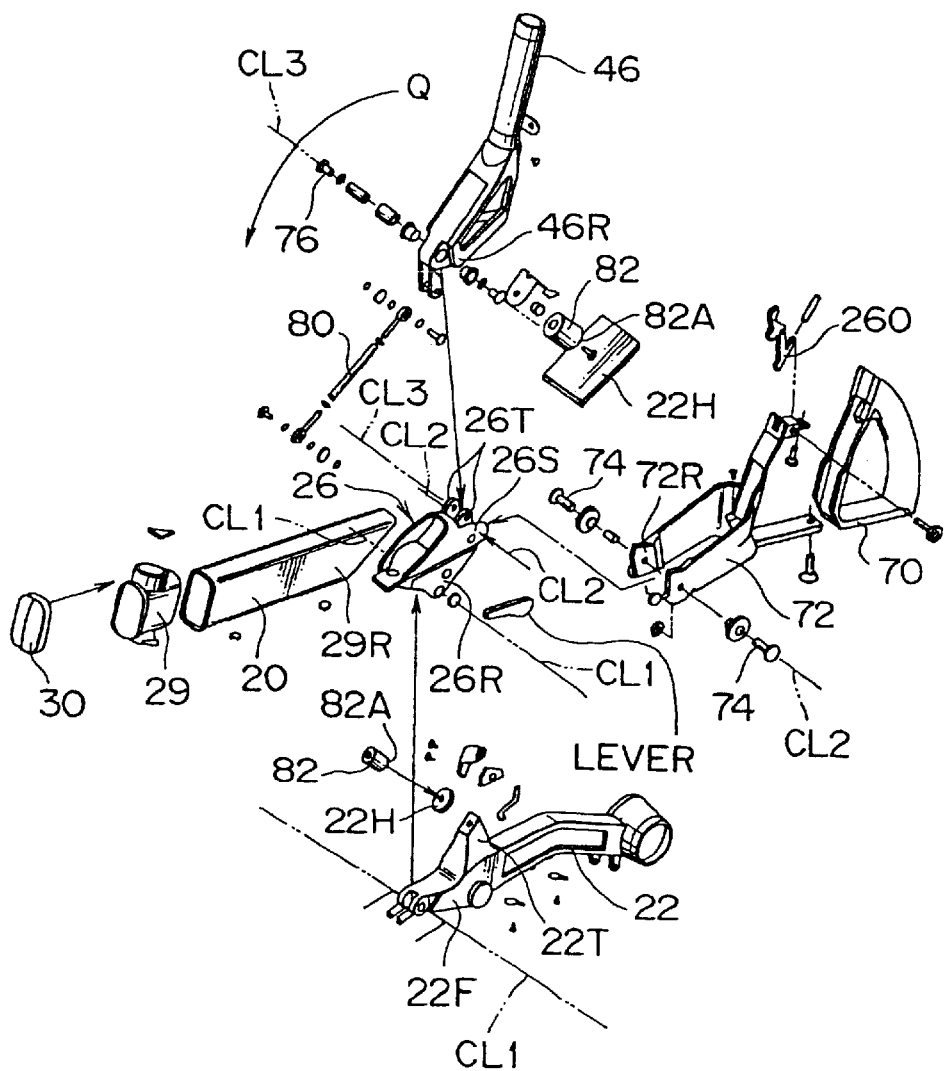

The following describes the linking portion 26 with reference to FIG. 13.

FIG. 13 shows an exemplary configuration of the linking portion 26 which links the holder 46, the first frame 20, the second frame 22, and a holder 72 of a grip 70.

The linking portion 26 is fixed to a rear portion 29R of the first frame 20. A linking member 26R of the linking portion 26 rotatably links to a linking member 22F of the second frame 22 around a pivot CL1 by use of a pin, not shown. A linking member 26S of the linking portion 26 rotatably links to a linking member 72R of the holder 72 of the grip 70 around rotational axis CL2 by use of a pin 74 or the like. A linking member 26T of the linking portion 26 rotatably links to a linking member 46R of the holder 46 around rotational axis CL3 by use of a pin 76 or the like.

Consequently, the first frame 20 and the second frame 22 can rotate around the pivot CL1. Likewise, the holder 46 and the grip 70 can rotate relative to the linking portion 26.

Figure 14A:
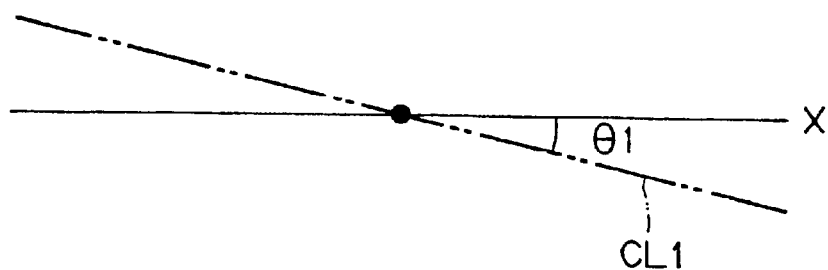
FIGS. 14A and 14B are diagrams briefly illustrating the arrangement directions of a pivot.
Figure 14B:
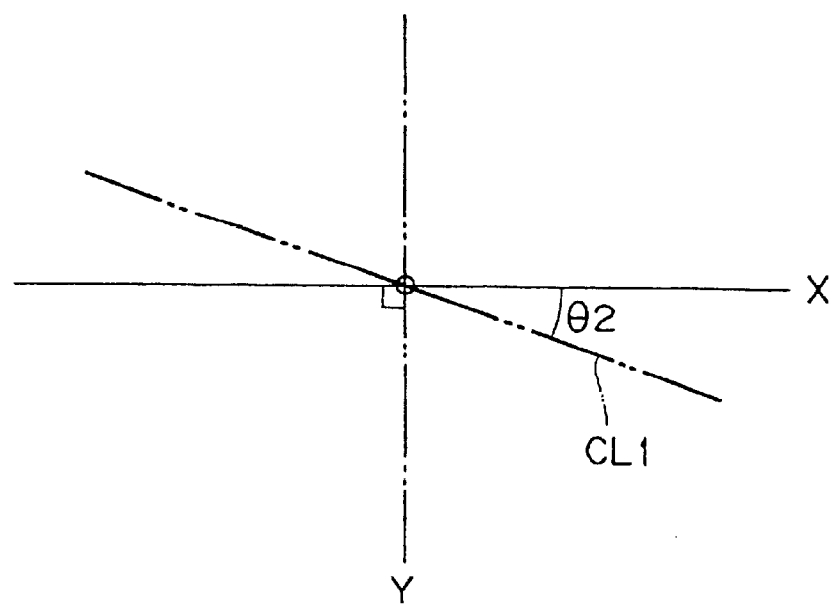

FIGS. 14A and 14B shows one example of the direction in which the pivot CL1 shown in FIG. 13 is set. As shown in FIG. 14A, which is an elevational view, the pivot CL1 tilts toward left-right axis X, which represents the axis of the left and right directions of the bicycle shown in FIG. 1, by a predetermined angle θ1. Furthermore, as shown in the plan view of FIG. 14B, the pivot CL1 tilts toward left-right axis X by θ2. Left-right axis X is at right angles to front-rear axis Y. Thus, the pivot CL1 tilts toward both front-rear axis and left-right axis of the bicycle; namely, the pivot CL1 tilts toward the running direction of the bicycle in a three-dimensional manner.

Figure 15:
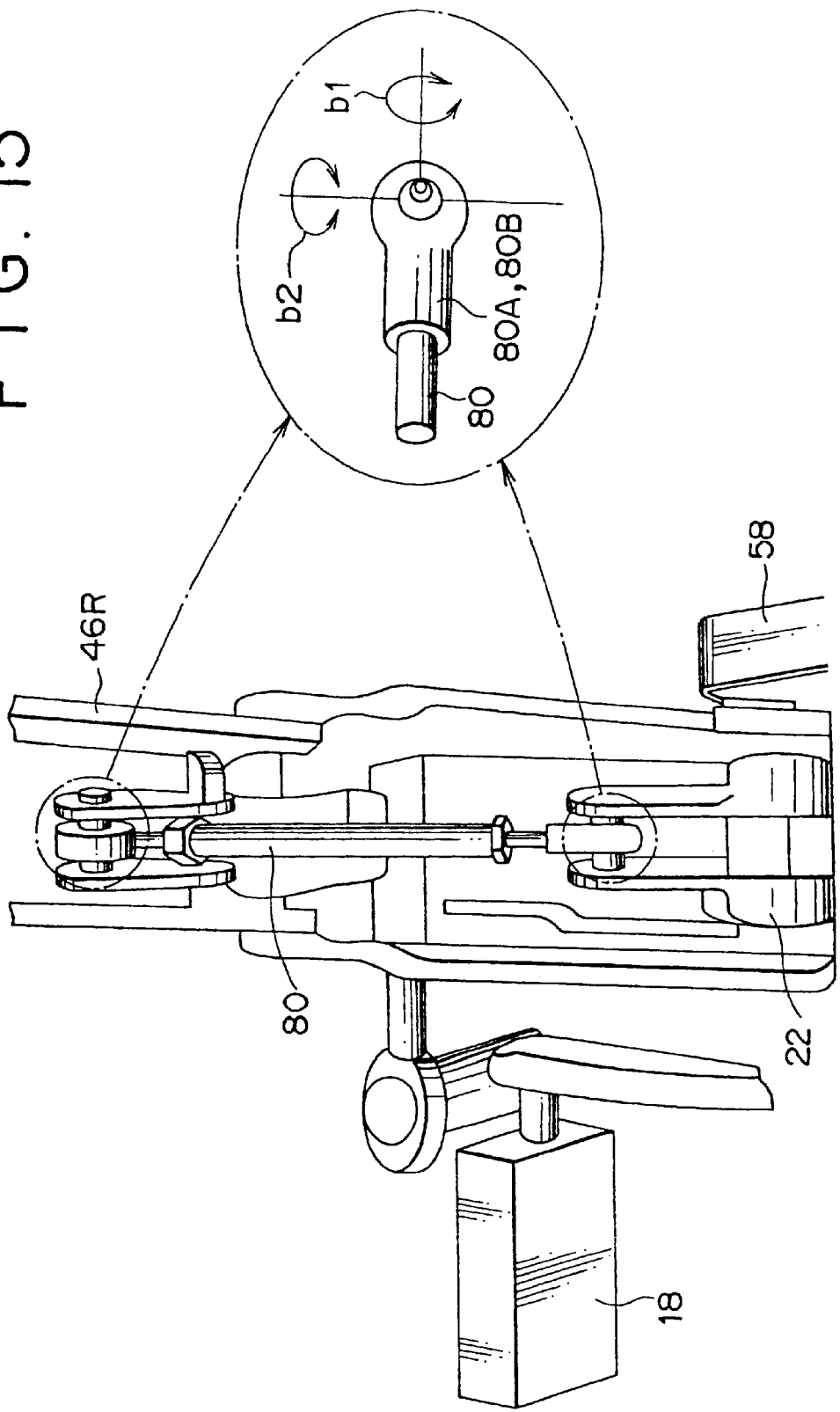
FIG. 15 is a perspective view illustrating a rod or the like for defining the rotational amounts of the saddle post and its holder.

As shown in FIGS. 13 and 15, a rod 80 is arranged between the linking member 46R of the holder 46 and the second frame 22. The rod 80 operatively associates the holder 46 with the second frame 22. When the first frame 20 and the second frame 22 are folded together, the post 16A of the saddle 16 moves in response to the movement of the second frame 22 by means of this rod 80, thus being folded on the side of the first frame 20 in a substantially overlapped manner. The rod 80 also serves as a support for the holder 46 as folded in the direction Q toward the first frame 20 around the center rotational axis CL3 as shown in FIG. 13.

As shown in FIG. 15, a bearing 80A located at one end of the rod 80 and a bearing 80B located at the other end thereof are each a joint which is preferably pivotal in the two directions shown. In this configuration, the pivot CL1 and rotational axis CL3 shown in FIGS. 14 and 13 are both tilted in the running direction of the bicycle in a three-dimensional manner as described before. The pivot CL1 connects between the linking portion 26 and the second frame 22 and rotational axis CL3 connects between the linking portion 26 and the holder 46. The pivot CL1 and rotational axis CL3 tilt at different angles with respect to each other. Consequently, the loci of the fulcrums of the bearing 80A and the bearing 80B of the rod 80 are three-dimensional, not coplanar.

Therefore, the bearing 80A and the bearing 80B of the rod 80 are adapted to move in not only rotational direction b1 but also left-right direction b2, thereby realizing the operative association between the holder 46 and the second frame 22.

As shown in FIG. 13, an elastic member 82 is arranged inside the holder 46, which absorbs a shock caused by the rider's sitting on the saddle 16 shown in FIG. 2. The top portion of this elastic member 82 is fixed to an inner surface of the holder 46 and lower portion 82A of the elastic member 82 abuts a plate 22H on the side of a projection 22T of the second frame 22. Consequently, when the rider sits on the saddle 16, the elastic member 82 transmits the shock generated thereby to the second frame 22 as well as mitigating the shock, or vibration.

Figure 16:
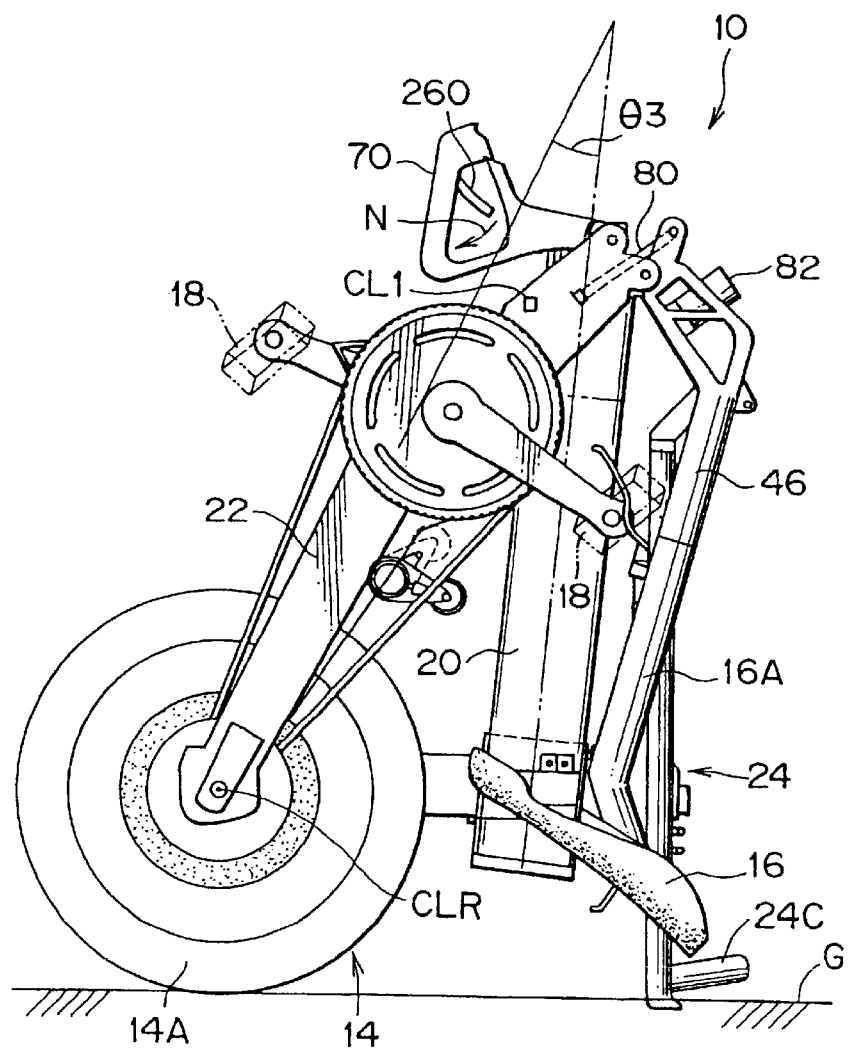
FIG. 16 is a side view illustrating the bicycle of FIG. 1 fully folded up and standing on its own.
Figure 17:
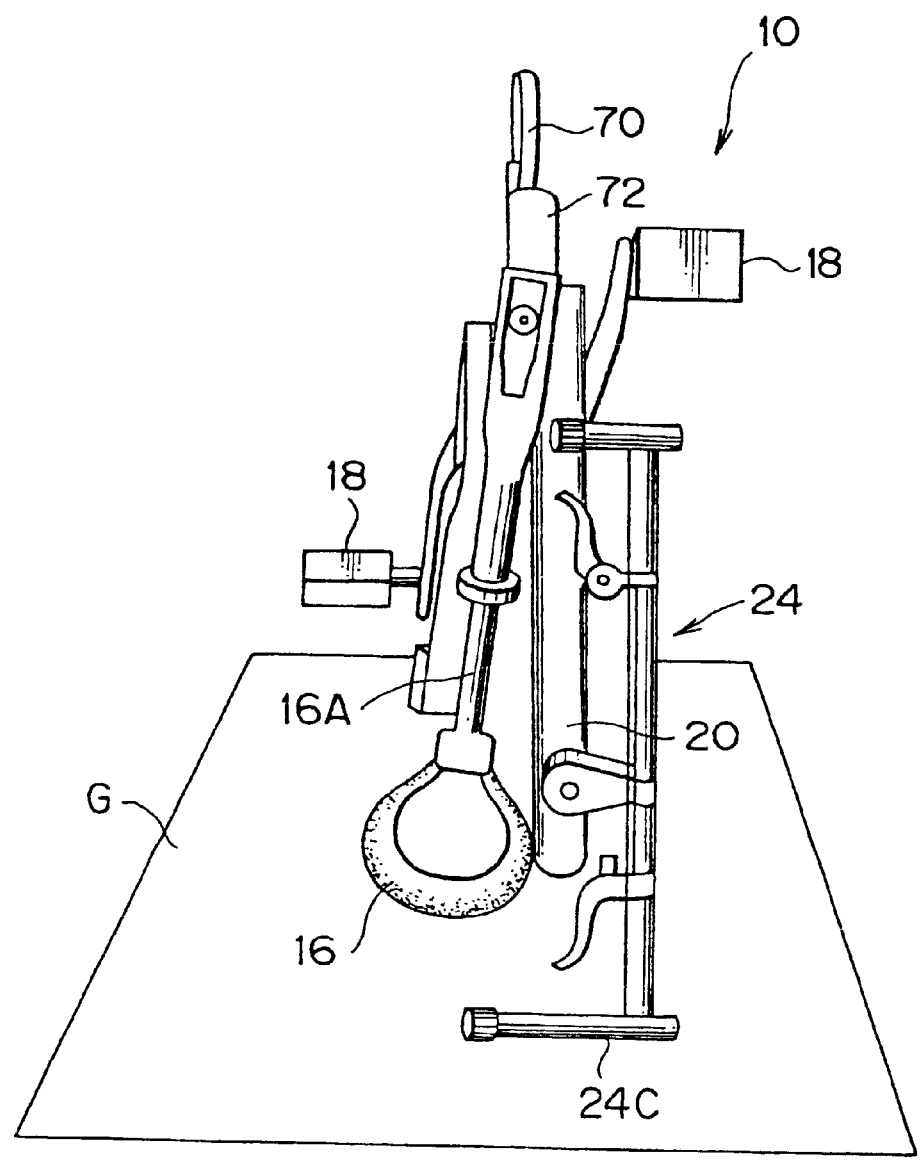
FIG. 17 is a perspective view illustrating the bicycle of FIG. 16 from the front.
Figure 18:
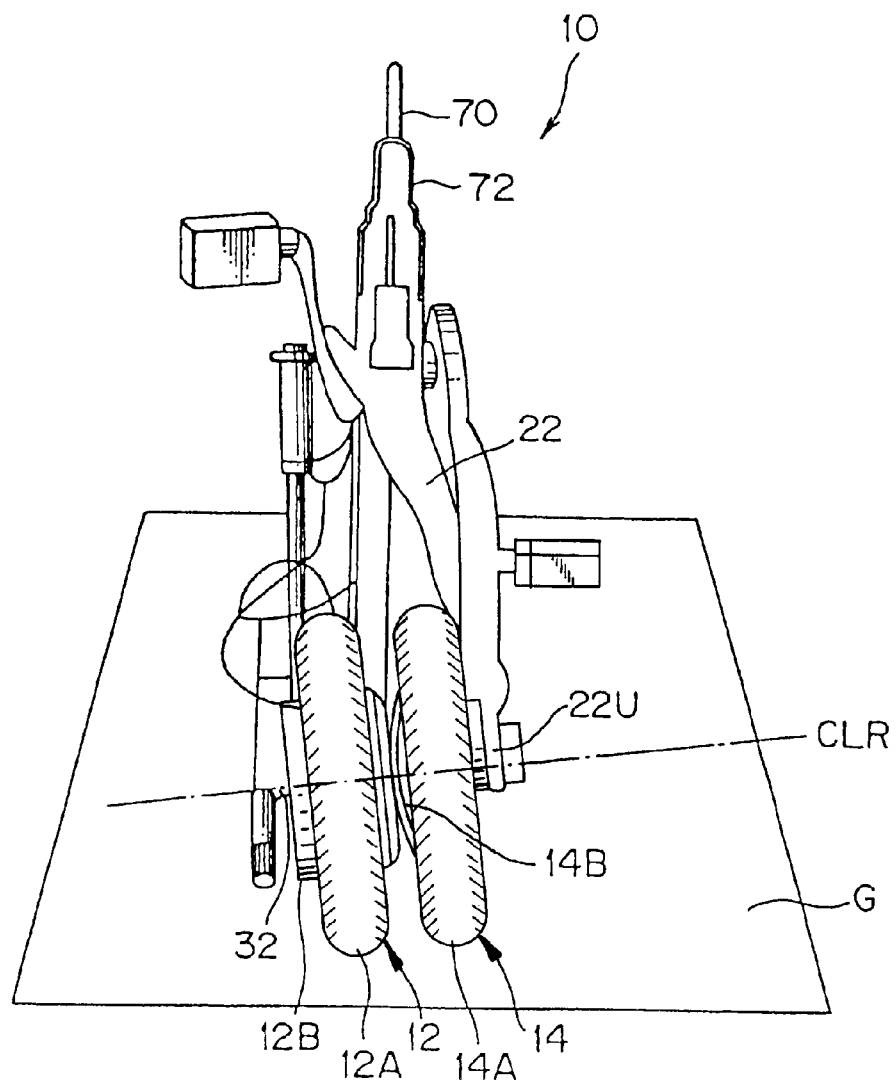
FIG. 18 is a perspective view illustrating the bicycle of FIG. 16 from behind.

FIGS. 16 through 18 show the states in which the bicycle 10 shown in FIG. 1 is folded and left standing on its own.

In the states in which the bicycle 10 shown in FIGS. 1 through 3 is folded, the front wheel 12 and the rear wheel 14 preferably overlap each other substantially coaxially about axis CLR. In this case, the stem holder 32 on the side of the front wheel 12 is located outside the front wheel 12 as shown in FIG. 18 and a rear end portion 22U of the second frame 22 of the rear wheel 14 is located outside the rear wheel 14. The stem holder 32 holds the front wheel 12 in a cantilever manner and the wheel 14B of the rear wheel 14 is held by the rear end portion 22U of the second frame 22 also in a cantilever manner, so that the stem holder 32 and the rear end portion 22U are not located between the folded front wheel 12 and rear wheel 14. Consequently, the tire 12A of the front wheel 12 and the tire 14A of the rear wheel 14 can be substantially coaxially overlapped in a compact manner.

As shown in FIG. 16, when the bicycle 10 is in the folded state, the grip 70 is located substantially on top of the bicycle 10, and the second frame 22 and the first frame 20 are folded together about the pivot CL1 at a predetermined angle θ3. The post 16A of the saddle 16 is folded substantially along the first frame 20. The stand portion 24C of the handle 24 is supported by ground G.

Thus, the folded bicycle 10 stands on ground G at the three points of the front wheel 12, the rear wheel 14, and the stand portion 24C as shown in FIGS. 16 through 18.

An unlocking portion 260 is arranged inside the grip 70 as shown in FIG. 16. When the rider pulls the unlocking portion 260 in the direction N while holding the grip 70, a locking mechanism, not shown, is unlocked, thereby releasing the first frame 20, the second frame 22, the post 16A, and the grip 70 from the locked state.

It should be noted that the reason why the front wheel 12 and the rear wheel 14 can be folded approximately fully overlapped as shown in FIGS. 16 through 18 is that the pivot CL1 described with reference to FIGS. 13 and 14 is tilted toward the running direction of the bicycle with respect to the front-rear axis Y and the left-right axis X in a three-dimensional manner.

The following briefly describes an example of the controller 100 shown in FIG. 2.

The controller 100 controls the pedaling assisting motor 31. The controller 100 comprises a torque sensor 120 of the crank 54 shown in FIG. 2, a current sensor 150, the key operating portion 32B, sensors 224D and 224E for sensing the braking operations of the brake levers 24D and 24E, a central processing unit 101, a clock generator 106, a driver 170, a digital input/output section 102, and a speed sensor 110 for sensing the speed of the motor 31.

The motor 31 is, for example, a three-phase motor and rotates on the drive waveforms of U phase, V phase, and W phase. The central processing unit 101 controls the motor 31 by means of Pulse Width Modulation (PWM) via the driver 170 on the basis of the clock generated by a PWM clock generator 103 based on the clock generated by the clock generator 106.

In controlling the motor 31, the central processing unit 101 captures a signal from a tilt sensor 124 indicative of the tilt of the bicycle and a detected value from a sensor 150 sensing the current level of the battery converted through an analog-to-digital converter 104. The central processing unit 101 optimizes the power assist control to be provided from the driver 170 to the motor 31 by taking, through the digital input/output section 102, a digital converted signal generated by detecting whether any of the brake levers 24D and 24E are operated and a signal generated from the torque sensor 120 by detecting how much force the rider is imparting pedaling the crank 54.

The following briefly describes how to ride the bicycle 10 shown in FIGS. 1 through 3. The rider rides on the saddle 16, grips the handle 24, and pedals on the pedals 18, upon which the crack 54 starts rotating. At this moment, when the torque sensor 120 senses the application of pedaling force to the crank 54, the driver 170 controls the motor 31. Thus controlled, the motor 31 can impart appropriate pedaling assisting force to the front wheel 12 shown in FIG. 2. Consequently, for example, the assisting force imparted by the motor 31 can assist the rider in pedaling up an ascending slope with less pedaling force than otherwise needed.

Figure 19:
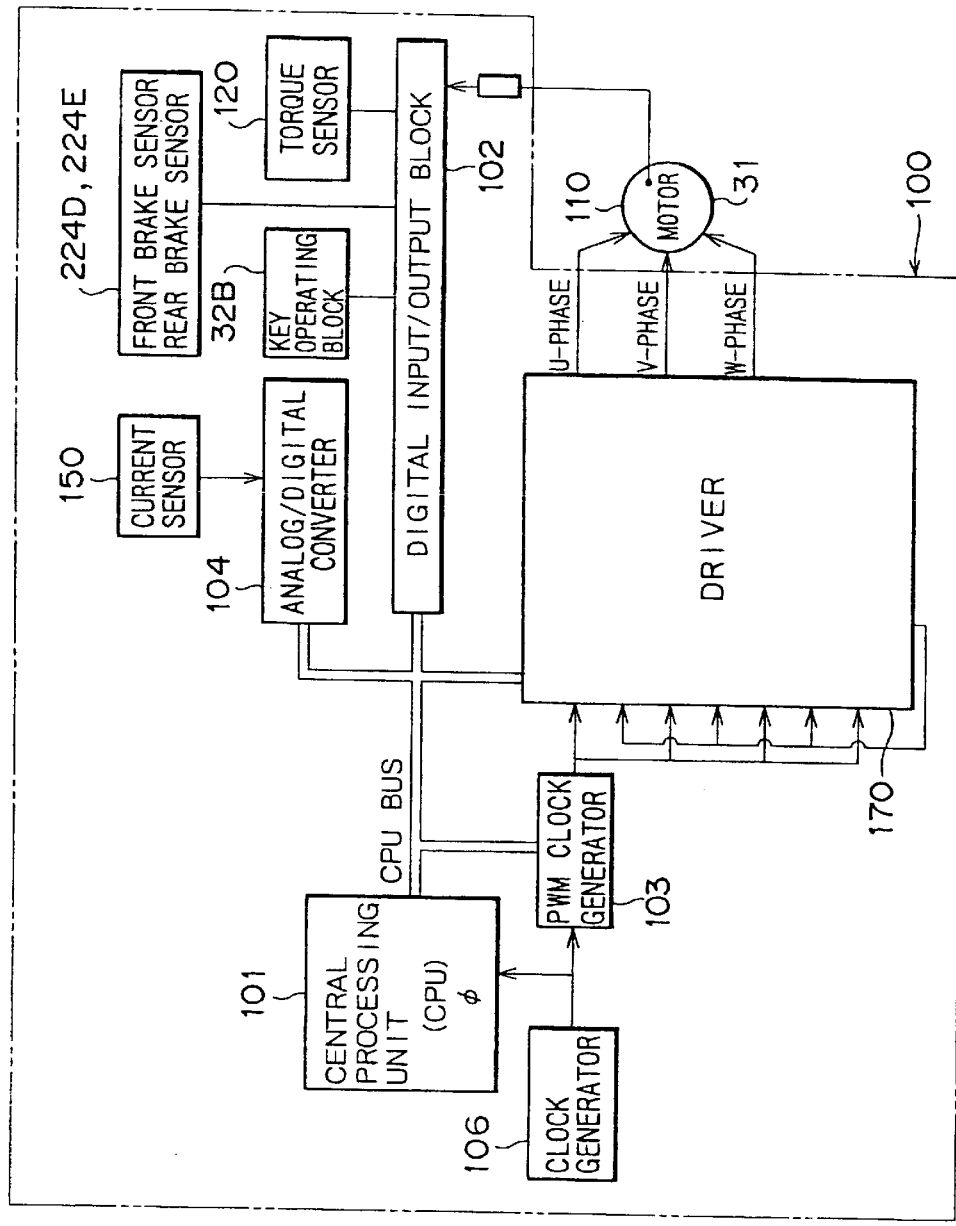

On a descending slope or flat terrain, for example, the motor 31 supplies assisting force to the front wheel 12 in accordance with the pedaling force to the crank sensed by the torque sensor 120 shown in FIG. 19.

Figure 28:
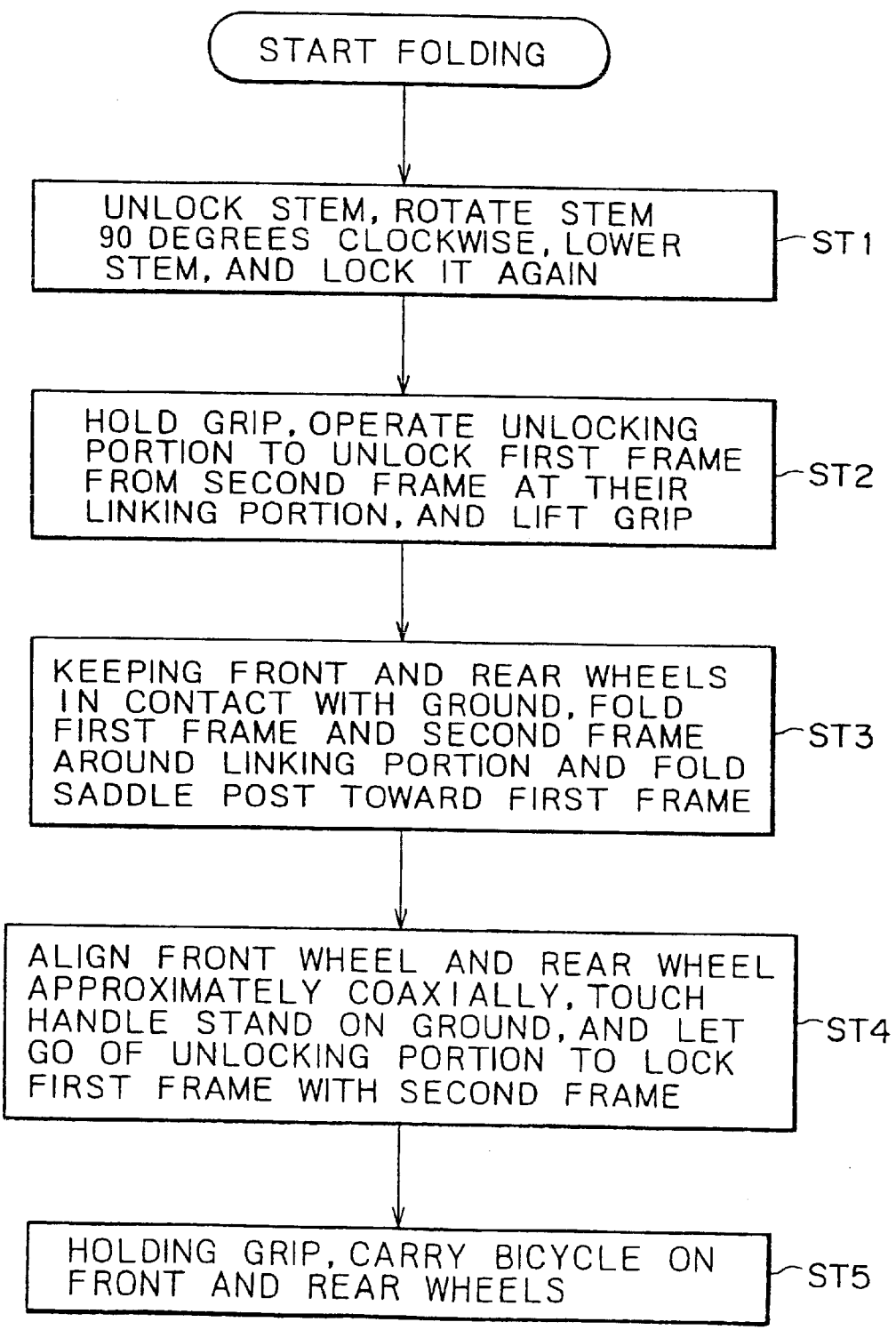
FIG. 28 is a flowchart describing a bicycle folding operation.

The following describes a bicycle folding method shown in FIGS. 20 through 28 with reference to the flowchart of FIG. 28.

Figure 20:
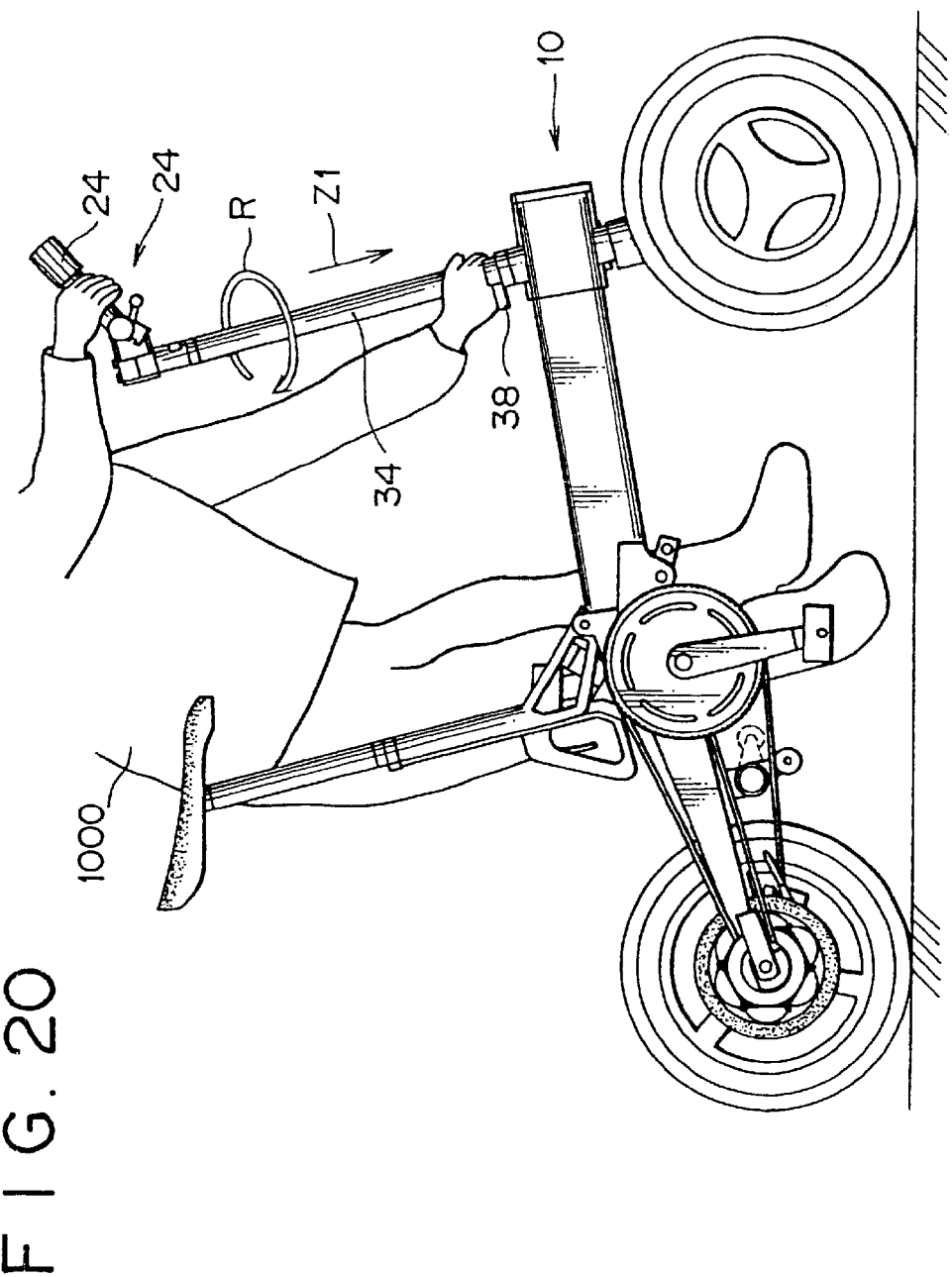
FIG. 20 is a side view illustrating a state in which the rider starts a folding operation.

In step ST1 of FIG. 28, a rider 1000 rotates the lock 38 of the stem 34 shown in FIG. 20 in the direction J to release the stem 34 from the stem holder 32. Then, the rider 1000 can lower the stem 34 of the handle 24 in the direction Z1 as shown in FIG. 20 and, at the same time, rotate the stem 34 in the direction R (clockwise when viewed from top).

Figure 21:
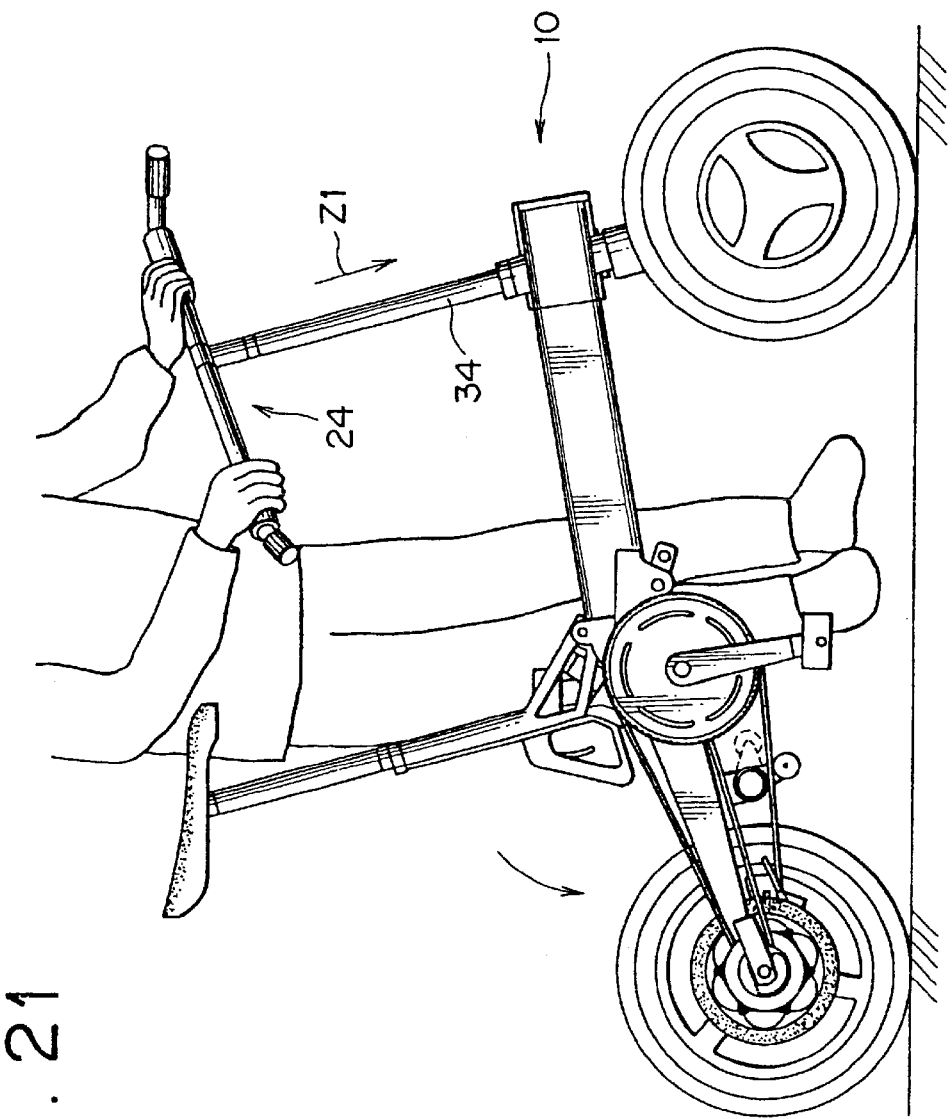
FIG. 21 is a side view illustrating a state in which the rider rotates the handle and starts lowering the same.
Figure 22:
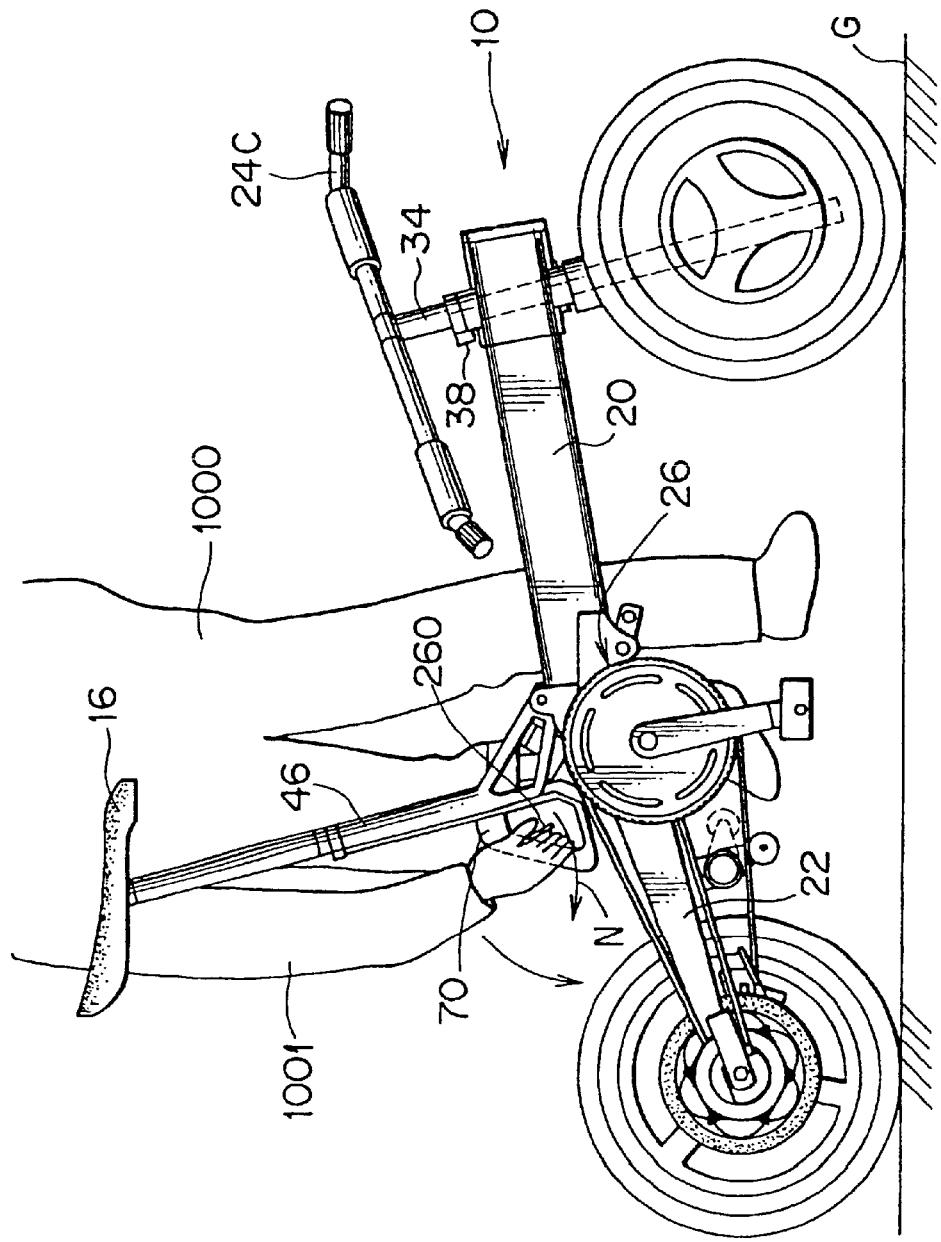
FIG. 22 is a side view illustrating a state in which the rider, after locking the lowered handle, is about to lift the linking portion by holding the grip.

FIG. 21 shows a state in which the handle 24 is being rotated by 90 degrees in the direction R and the stem 34 is being lowered in the direction Z1. As shown in FIG. 22, the stem 34 is lowered, and the stopper 34D abuts the upper end portion 32E of the stem holder 32 with the notch 34E of the stem 34 directed to the marker 32M of the mount 32A as shown in FIGS. 10 and 11. Consequently, the stem 34 does not lower any further in the direction Z1. When the rider 1000 rotates the lock 38 in the direction opposite to J, the notch 34E can be fully fixed to the mount 32A. After locking the stem 34 to prevent the same from being rotated and lifted in the direction Z2, the rider 1000 proceeds to lifting step ST2 shown in FIG. 28.

In step ST2, the rider 1000 grips the grip 70 by the hand 1001 and pulls the unlocking portion 260 in the direction N. This releases the first frame 20, the second frame 22, the holder 46 of the saddle 16, and the grip 70 from the locked state as shown in FIG. 22.

Figure 23:
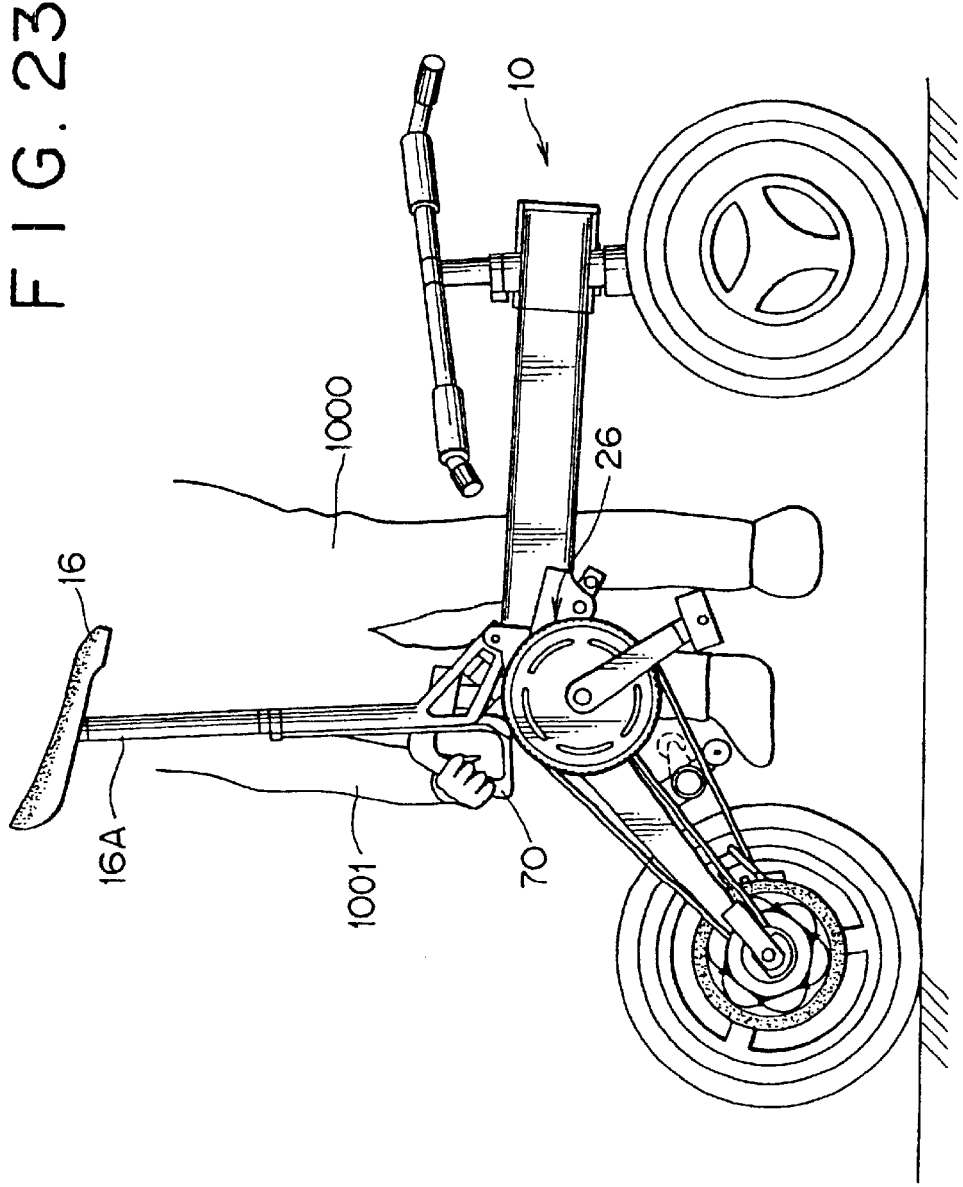
FIG. 23 is a side view illustrating a state in which the rider is lifting the linking portion.

In FIG. 23, the rider 1000 is about to lift the grip 70 by the hand 1001.

Figure 24:
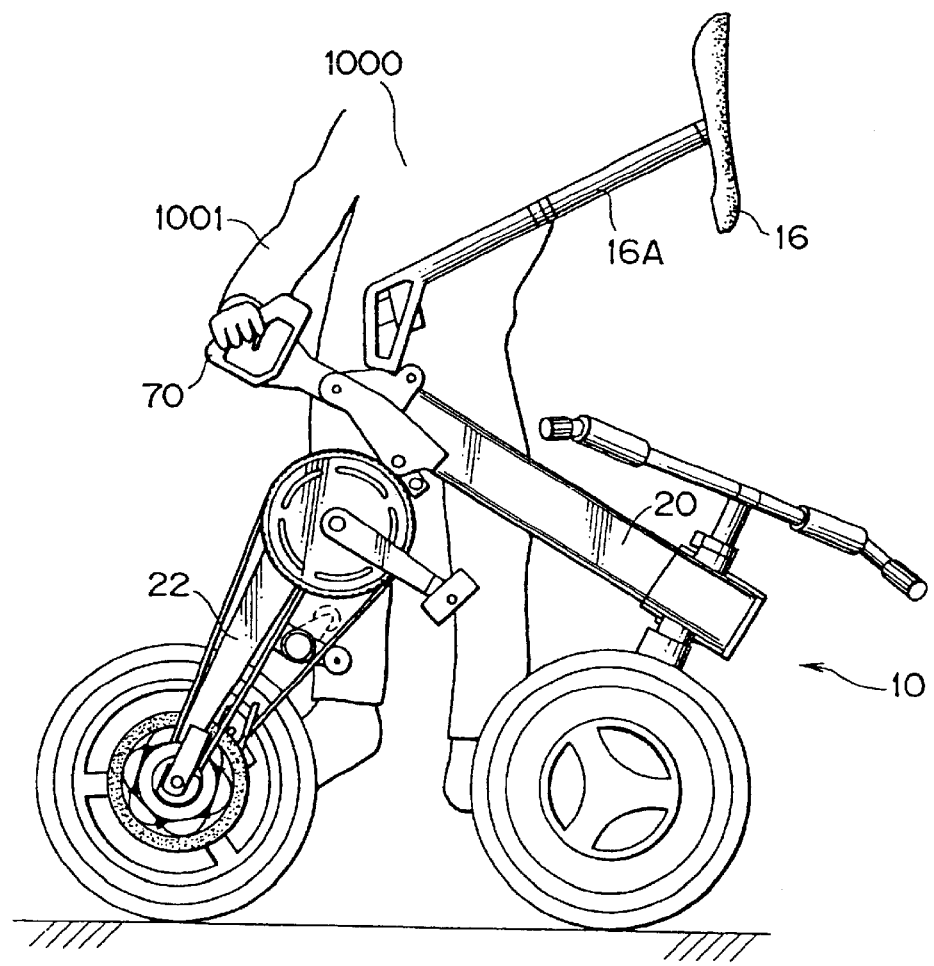
FIG. 24 is a side view illustrating a state in which the rider is trying to keep the saddle holder on the side of the first frame.
Figure 25:
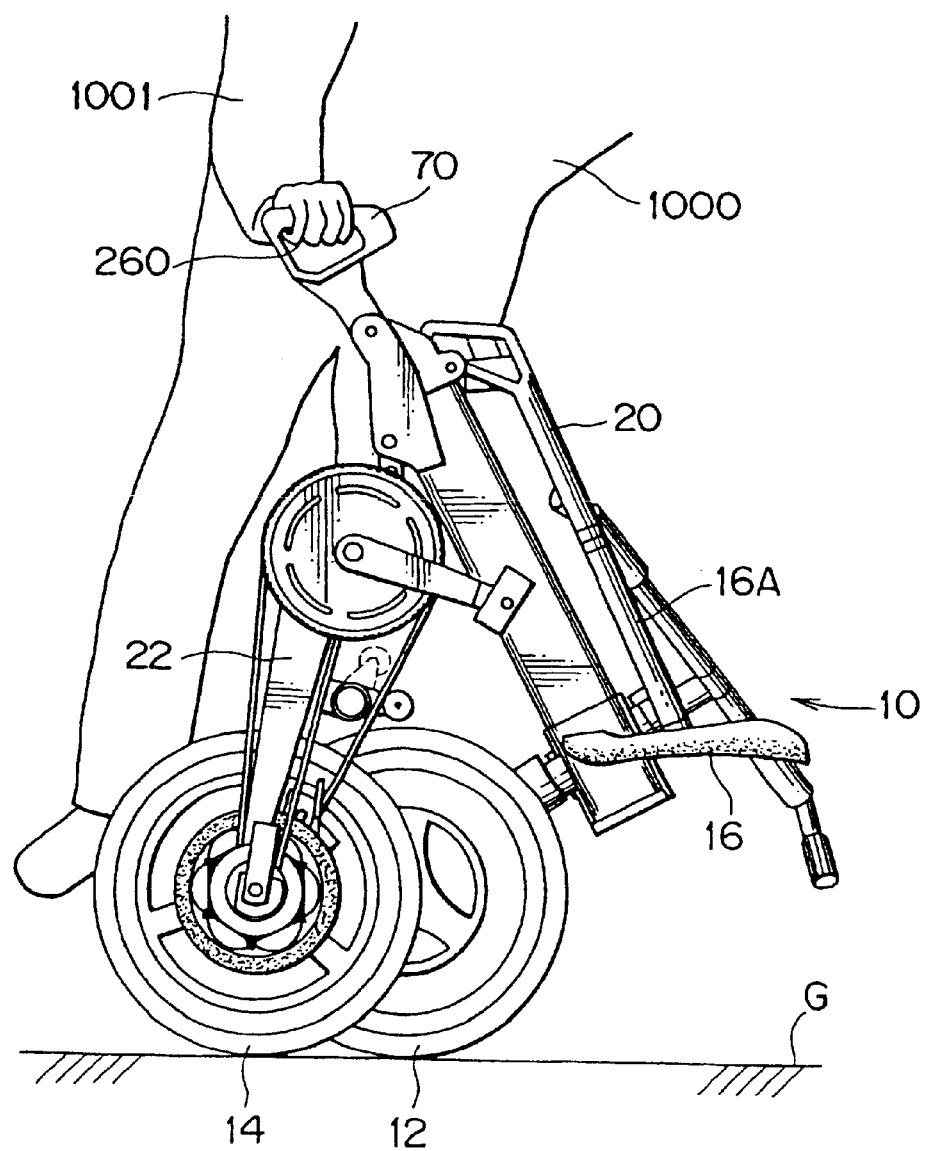
FIG. 25 is a side view illustrating a state in which the front wheel and the rear wheel starts overlapping each other.
Figure 26:
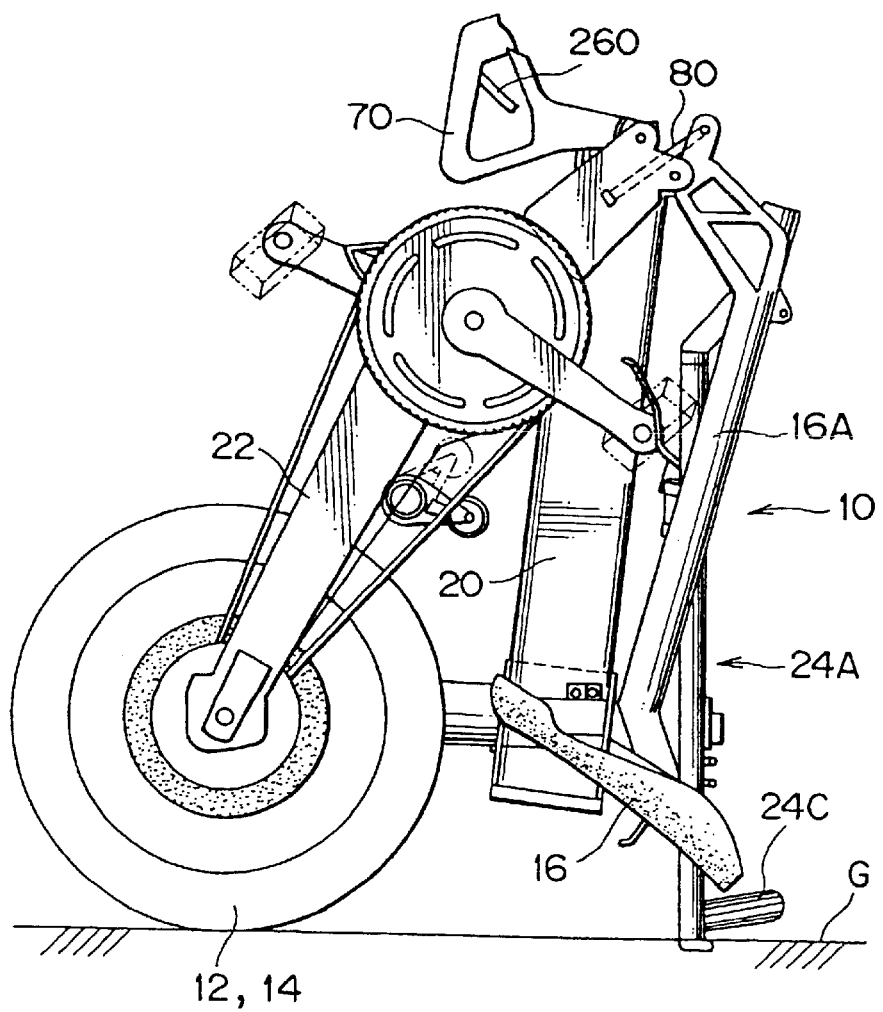
FIG. 26 is a side view illustrating a state in which the bicycle of FIG. 1 is fully folded up and standing on its own.
Figure 27:
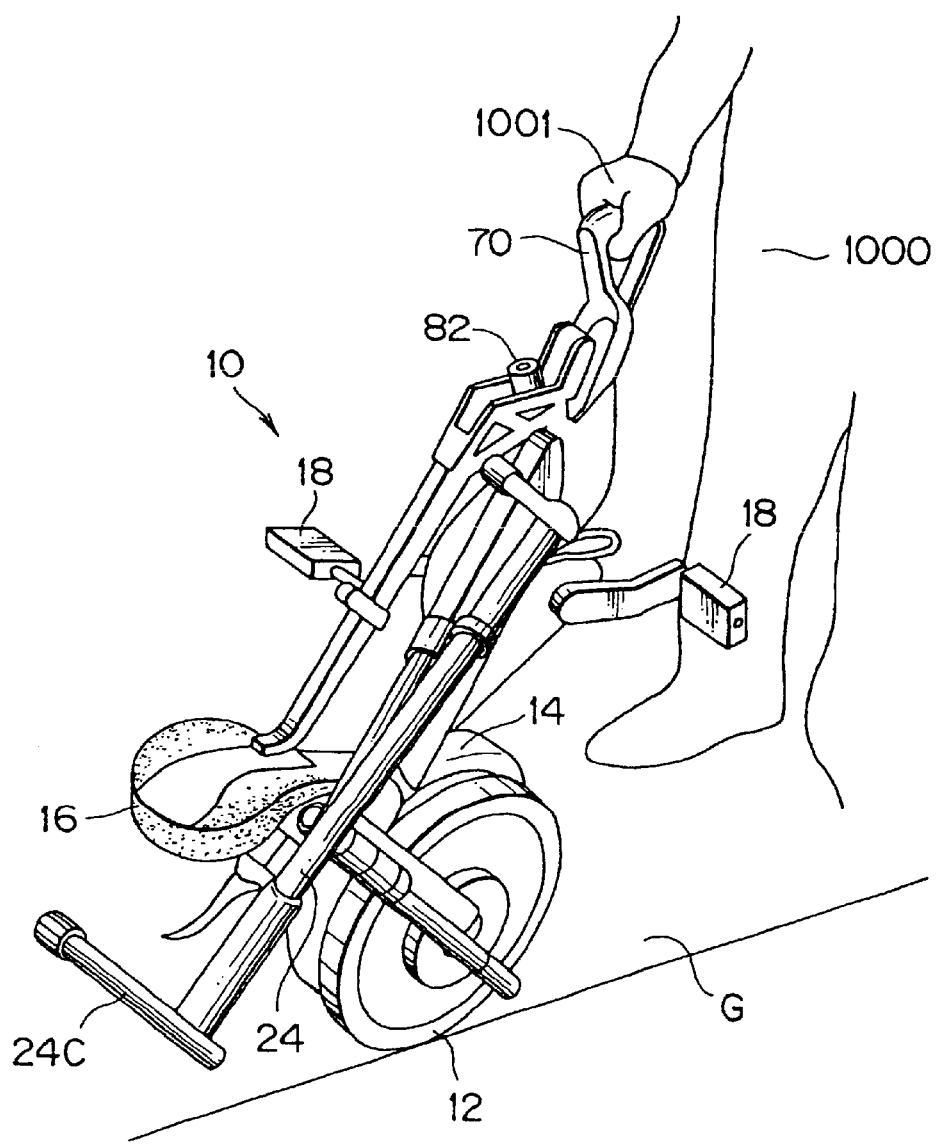
FIG. 27 is a perspective view illustrating a state in which the rider carries the folded bicycle.

In folding step ST3 of FIG. 28, a state is shown in which the first frame 20 and the second frame 22 have been folded to fairly large angles to each other as shown in FIG. 24. FIG. 25 shows a state in which the first frame 20 and the second frame 22 have been folded further with the front wheel 12 and the rear wheel 14 being gradually overlapping each other. Then, as shown in FIG. 26, the folding operation is completed with the front wheel 12 and the rear wheel 14 approximately fully overlapped. It should be noted that the post 16A of the saddle 16 is folded approximately in parallel to the side of the first frame 20. Namely, the post 16A is operatively associated with the folding operation of the first frame 20 and the second frame 22 and, at the approximately full overlapping of the front wheel 12 and the rear wheel 14, the post 16A has been automatically folded in response to the movement of the second frame 22.

The above-mentioned folding operation is characterized in that the bicycle 10 can be folded while traveling with the front wheel 12 and the rear wheel 14 kept in contact with ground G as shown in FIGS. 22 through 25. This allows the rider 1000 to fold the bicycle 10 relatively easily without much being aware of the weight of the bicycle 10 and therefore without using much folding force.

In step ST4 of FIG. 28, the rider 1000 lets go of the unlocking portion 260, thereby locking each component into a fully folded state as shown in FIG. 26. Namely, the first frame 20 and the second frame 22 maintain the locked state shown in FIG. 26.

In the fully folded state shown in FIG. 26, the front wheel 12, the rear wheel 14, and the stand portion 24C of the handle 24 support, form three points of the bicycle 10 that rest on ground G. This three-point support allows the bicycle 10 to steadfastly stand on its own in a fully folded state. In the fully folded state, the stem 16A of the saddle 16 can be folded approximately in parallel to the first frame 20 and the grip 70 can also be folded approximately in parallel, resulting in a very compact folding.

When the rider 1000 moves the folded bicycle 10 shown in FIG. 26, the rider 1000 takes hold of the grip 70 by the hand 1001 as described in step ST5 of FIG. 28 and carries the bicycle 1000 on the front wheel 12 and the rear wheel 14 easily with the stand portion 24C off ground G. Carrying about of the bicycle 10 is thus simple because, as described, the bicycle 10 can be folded with the front wheel 12 and the rear wheel 14 approximately coaxially or coaxially overlapped each other and the stand portion 24C is positioned in front of the front wheel 12 and the rear wheel 14.

The following briefly describes an unfolding operation for restoring the folded bicycle 10 to an unfolded and ridable state with reference to FIGS. 26 through 20 and the flowchart of FIG. 29.

In step ST6 of FIG. 29, the rider 1000 takes hold of the grip 70 shown in FIG. 26 by the hand 1001 and operates the unlocking portion 260 to unlock the locking mechanism which is maintaining the folded state shown in FIG. 26. This frees the first frame 20 and the second frame 22 from the locked state.

In step ST7 of FIG. 29, holding the post 16A, the rider 1000 gradually opens the folded bicycle in the direction opposite to the direction in which the bicycle 1000 was folded, as shown in FIG. 25. Consequently, the front wheel 12 and the rear wheel 14 depart from each other while maintaining contact with the ground G.

In ST8 of FIG. 29, when the bicycle 10 changes from the states shown in FIGS. 24 and 23 into the state shown in FIG. 22, the rider 1000 lets go of the locking portion 260 to lock the first frame 20, the second frame 22, the holder 46, and the grip 70 again.

In step ST9 of FIG. 29, the rider 1000 rotates the lock 38 in the direction J shown in FIG. 10 to free the stem 34 from the stem holder 32. When the rider 1000 lifts the stem 34 in the direction Z2 and rotates the same counterclockwise, the handle 24 returns from the state shown in FIG. 21 to the ridable state shown in FIG. 20. Then, by rotating the lock 38 in the direction opposite to the direction J shown in FIG. 10, the rider 1000 can lock the handle 24 and the stem 34 to the stem holder 32.

The above-mentioned embodiment of the invention provides the following advantages.

Because the pivot CL1 for folding the bicycle 10 three-dimensionally tilts relative to the running direction, the front wheel 12 and the rear wheel 14 can be arranged coaxially and therefore compactly folded. In addition, in the folding process, the front wheel 12 and the rear wheel 14 are gradually overlapped while being not separated from the ground but rolled on the ground, requiring less folding force and stabilizing the folding operation.

The locking portion for use in folding the bicycle 10 from the ridable state is arranged inside the grip and, when the rider lifts the grip, the folding operation is completed, upon which the folded bicycle is automatically locked into the folded state. The grip also serves as a grip for allowing the rider to carry the folded bicycle.

When the bicycle 10 is in the folded state, the bicycle 10 is in contact with the ground at the coaxially arranged front wheel and rear wheel, thereby allowing the rider to easily push or pull the folded bicycle while holding the grip.

The stem 34, which is a pipe connecting the front wheel with the handle, is offset from the upper visual center of the first frame 20. This increases the slide amount necessary for folding, resulting in the compact folding size.

The stem 34 for steering the front wheel is not penetrating the first frame, so that the battery can be accessed at the front end of the first frame.

In addition to the function of operating the handle, the stand portion 24C also functions as a stand for standing the folded bicycle 10 on its own.

The lever-shaped lock 38 attached to the stem 34 linking the front wheel and the handle is rotated by 90 degrees for unlocking, allowing the handle to be lowered while the handle being rotated. When this occurs, the lower portion of the stem 34 offset from the center of the first frame 20 as shown in FIG. 22 can radially penetrate in the direction inside to the front wheel 12, allowing the handle 24 to be lowered to just above the first frame 20. Continuing, the handle 24 and the first frame 20 are parallel to each other. At the same time, the stand portion 24C of the handle 24 is at 90 degrees to the first frame 20 to provide a stand for allowing the folded bicycle 10 to stand on its own.

The rider then takes hold of the grip 70 located at the rear side of the folded bicycle 10 and pulls the trigger of the unlocking portion 260 located inside the grip 70, lifting the grip. This brings the front wheel 12 and the rear wheel 14 over each other to a coaxial position. When the wheels are brought to the end point, the folded bicycle 10 is automatically locked maintaining the folded state.

The portions of the bicycle which the rider operates are clearly defined, so that hazards such as a rider hand's getting caught in the movable portions can be avoided and the folding and unfolding procedures can be understood with ease for the beginner. When the folding of the bicycle has been completed, the front and rear wheels approximately coaxially overlap each other, which facilitates the carrying or moving about of the bicycle on the front and rear wheels. Because the front and rear wheels are of a cantilever configuration, each supported from a different direction, and, when the front and rear wheels are approximately coaxially overlapped, they are overlapped in such a manner that the unsupported sides thereof are inwardly overlapped, resulting in a small width dimension in the folded state.

The battery (or a battery pack) BT is fully accommodated inside the first frame 20, resulting in good weather resistance and good external appearance of the bicycle in its entirety. Because the shaft for steering the front wheel does not pass through the first frame 20, the battery BT can be accessed at the front end of the first frame 20 regardless whether the bicycle is in the folded state or the ridable state.

The applicant is unaware of the existence of any commercially available bicycles that contain the above-mentioned advantages in folding a bicycle.

The bicycle according to the present invention can be easily and instantly folded and easily carried or moved about in the folded state without losing the performance and safety inherent to bicycles.

While the preferred embodiment of the present invention has been described using specific terms, such description is for illustrative purposes only, and it is to be understood that changes and variations may be made without departing from the spirit or scope of the appended claims. For example, the above-mentioned embodiment is a so-called motor-assisted bicycle which utilizes a motor for power assist. It will be apparent to those skilled in the art that the present invention is not limited to the power-assists using the motor but may be applicable to usual bicycles of a type in which the vehicle is operable not by the motor but only human or leg power.

It will also be apparent to those skilled in the art that the power assisting motor may be set to the rear wheel in the case of a motor-assisted bicycle. Alternatively, both wheels may have each the motor, or at least one of the wheels may have two tires.

It will also be apparent to those skilled in the art that the battery may be of another shape than a long box. Also, the battery may be accommodated inside the second frame, the saddle post, or the handle stem for example.

As described and according to the invention, the rider can easily and securely fold and unfold the bicycle.

What is claimed is:

1. A bicycle comprising:
   a front wheel and a rear wheel;
   a saddle on which a rider rides;
   a pair of pedals to which said rider imparts drive force;
   a first frame for holding said front wheel in a rotative manner;
   a handle for changing the direction of said front wheel;
   a second frame for holding said rear wheel in a rotative manner;
   a linking portion for linking a linking member of said first frame with a linking member of said second frame;

a stem for linking said front wheel and said handle, said stem being offset from the center of a direction changing axis of said front wheel; and a stem holding portion for pivotally lowering said stem relative to said front wheel and said first frame, and a locking portion for locking said stem pivotally lowered onto said first frame;

wherein when said first frame and said second frame are brought toward each other by lifting said linking portion with said front wheel and said rear wheel kept in contact with the ground, said bicycle is in a folded position with said front wheel and said rear wheel overlapping each other in at least one portion.

2. A bicycle according to claims 1, further comprising a motor for imparting pedaling assisting force on at least one of said front wheel and said rear wheel, a battery for energizing said motor being detachably accommodated inside said first frame.

3. A bicycle according to claim 2, wherein said first frame has at a front end thereof a lid through which said battery is accessed.

4. A method for folding a bicycle of the type comprising a linking portion of a bicycle that links a linking member of a first frame having a front wheel with a linking member of a second frame having a rear wheel; a stem that links said front wheel and a handle of said bicycle, said stem being offset from the center of a direction changing axis of said front wheel; a stem holding portion for pivotally lowering said stem relative to said front wheel and said first frame; and a locking portion for locking said stem pivotally lowered onto said first frame; and comprising the steps of:

lifting by a rider of said linking; and folding said first frame and second frame with said front wheel and said rear wheel kept in contact with the ground in a state where said front wheel and said rear wheel overlap each other in at least one portion.

5. The method for folding a bicycle according to claim 4, further comprising the steps of imparting pedaling assisting force from a motor on at least one of said front wheel and said rear wheel, and energizing said motor from a battery being detachably accommodated inside said first frame.

* * * * *